US012616973B2

(12) United States Patent
Graham et al.

(10) Patent No.: US 12,616,973 B2
(45) Date of Patent: May 5, 2026

(54) METHODS, DEVICES, AND RELATED ASPECTS FOR COLLECTING AND STORING SAMPLES

(71) Applicant: THE JOHNS HOPKINS UNIVERSITY, Baltimore, MD (US)

(72) Inventors: David Raymond Graham, Baltimore, MD (US); Jeffrey D. Freeman, Pulaski, VA (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 1411 days.

(21) Appl. No.: 17/186,874

(22) Filed: Feb. 26, 2021

(65) Prior Publication Data

US 2021/0268494 A1 Sep. 2, 2021

Related U.S. Application Data

(60) Provisional application No. 63/027,224, filed on May 19, 2020, provisional application No. 62/983,373, filed on Feb. 28, 2020.

(51) Int. Cl.
*B01L 3/00* (2006.01)

(52) U.S. Cl.
CPC ....... *B01L 3/508* (2013.01); *B01L 2200/0689* (2013.01); *B01L 2300/04* (2013.01); *B01L 2300/0816* (2013.01); *B01L 2300/105* (2013.01)

(58) Field of Classification Search
CPC ...... B01L 3/5023; B01L 3/508; B01L 3/5085; B01L 2200/0689; B01L 2300/0816; B01L 2300/105; G01N 1/405; G01N 2001/028
See application file for complete search history.

(56) References Cited

U.S. PATENT DOCUMENTS

| | | | |
|---|---|---|---|
| 9,040,236 | B2 | 5/2015 | Hill et al. |
| 9,759,640 | B2 | 9/2017 | Hill et al. |

(Continued)

FOREIGN PATENT DOCUMENTS

| | | | |
|---|---|---|---|
| EP | 3017869 | A1 | 5/2016 |
| WO | 2018178204 | A1 | 10/2018 |
| WO | 2018231960 | A1 | 12/2018 |

OTHER PUBLICATIONS

Pessenda Garcia, P. (Authorized officer), Extended European Search Report in corresponding European Application No. 21760028.7 mailed on Jun. 20, 2024, 24 pages.

(Continued)

*Primary Examiner* — Charles Capozzi
*Assistant Examiner* — Dwayne K Handy
(74) *Attorney, Agent, or Firm* — MH2 Technology Law Group LLP

(57) ABSTRACT

Provided herein are sample collection devices that include a first body structure portion that comprises a drying agent compartment configured to receive a drying agent and a second body structure portion operably connected, or connectable, to the first body structure portion. The second body structure portion includes a sample collection support compartment comprising one or more segments that communicate with the drying agent compartment at least when the first and second body structure portions are operably connected to one another in a closed position. The sample collection support compartment is configured to receive a sample collection support. Related kits, systems, computer readable media, and methods are also provided.

40 Claims, 16 Drawing Sheets

(56) References Cited

U.S. PATENT DOCUMENTS

| | | | |
|---|---|---|---|
| 2004/0086874 | A1 | 5/2004 | Parker |
| 2005/0227269 | A1 | 10/2005 | Lloyd et al. |
| 2007/0042340 | A1 | 2/2007 | Kononen et al. |
| 2018/0133711 | A1 | 5/2018 | Funk et al. |
| 2019/0168210 | A1 | 6/2019 | Anderson |

OTHER PUBLICATIONS

International Search Report and Written Opinion in corresponding International Application No. PCT/US2021/019928 mailed on Jun. 10, 2021, 10 pages.

International Preliminary Report on Patentability in corresponding Application No. PCT/US2021/019928 mailed on Sep. 9, 2022, 9 pages.

Culley et al., "A review of the literature on the validity of mass casualty triage systems with a focus on chemical exposures", American journal of disaster medicine, (2014), vol. 9., No. 2, pp. 137-150.

Decker et al., "Recommendations for Biomonitoring of Emergency Responders: Focus on Occupational Health Investigations and Occupational Health Research", Military Medicine, (2013), vol. 178, No. 1, pp. 68-75.

Speake et al., "Longitudinal monitoring of gene expression in ultra-low-volume blood samples self-collected at home", Clinical & Experimental Immunology, (2017), vol. 188, pp. 226-233.

Li et al., "Dried blood spot sampling in combination with LC-MS/MS for quantitative analysis of small molecules", Biomedical Chromatography, (2010), vol. 24, pp. 49-65.

PreAnalytiX., "PAXgene Blood RNA Kit Handbook", PreAnalytiX GmbH, Feb. 2019, 72 pages.

Qiagen, "Rneasy Micro Handbook", Sample to Insight, Mar. 2021, 84 pages.

Qiagen, "QuantiTect Probe PCR Handbook", Sample & Assay Technologies, May 2011, 28 pages.

Miyaura et al., "Palladium-Catalyzed Cross-Coupling Reactions of Organoboron Compounds", Chemical Reviews., (1995), vol. 95, No. 7, pp. 2457-2483.

Goebel et al., "The Oxidation of Grignard Reagents", Journal of the American Chemical Society., Apr. 1933, vol. 55 (4), pp. 1693-1696.

Frampton et al., "Organosilicon Biotechnology", Silicon, (2009), vol. 1, pp. 147-163.

Caseri., "Initial organotin chemistry", Journal of Organometallic Chemistry, (2014), vol. 751, pp. 20-24.

Demirev et al., "Dried blood spots: analysis and applications", Analytical chemistry, (2013), vol. 85 (2), pp. 779-789.

Hannon et al., "Overview of the History and Applications of Dried Blood Samples", Dried Blood Spots: Applications and Techniques, (2014), First Edition, pp. 1-15.

Corso et al., A powerful couple in the future of clinical biochemistry: in situ analysis of dried blood spots by ambient mass spectrometry., Bioanalysis., (2012), pp. 1883-1891, vol. 2(11).

Freeman et al., "State of the Science in Dried Blood Spots", Clinical Chemistry, (2018), vol. 64, No. 4, pp. 656-679.

Mcdade et al., "Development and validation of assay protocols for use with dried blood spot samples", American Journal of Human Biology, (2014), vol. 26, No. 1, pp. 1-9.

Mcdade et al., "What a drop can do: dried blood spots as a minimally invasive method for integrating biomarkers into population-based research", Demography, Nov. 2007, vol. 44, No. 4, pp. 899-925.

Sadones et al., Spot them in the spot: analysis of abused substances using dried blood spots., Bioanalysis., (2014), pp. 2211-2227, vol. 6(17).

Meesters et al., State-of-the-art dried blood spot analysis: an overview of recent advances and future trends., Bioanalysis., (2013), pp. 2187-2208, vol. 5(17).

Edelbroek et al., "Dried blood spot methods in therapeutic drug monitoring: methods, assays, and pitfalls", Therapeutic Drug Monitoring., Jun. 2009, vol. 31, No. 3, pp. 327-336.

Chace et al., "Use of tandem mass spectrometry for multianalyte screening of dried blood specimens from newborns", Clinical Chemistry, (2003), vol. 49, No. 11, pp. 1797-1817.

Mei et al., "Use of filter paper for the collection and analysis of human whole blood specimens", The Journal of Nutrition., (2001), vol. 131.5, pp. 1631S-1636S.

Stove et al., "Dried blood spots in toxicology: from the cradle to the grave?", Critical reviews in toxicology, Feb. 21, 2012, vol. 42.3, pp. 230-243.

Timmerman et al., "EBF recommendation on the validation of bioanalytical methods for dried blood spots", Bioanalysis., (2011), vol. 3, No. 14, pp. 1567-1575.

Smit et al., "An Overview of the Clinical Use of Filter Paper in the Diagnosis of Tropical Diseases", The American journal of tropical medicine and hygiene, (2014), vol. 90, No. 2, pp. 195-210.

Sharma et al., "Dired blood spots: concepts, present status, and future perspectives in bioanalysis", Drug testing and analysis, Apr. 1, 2014, vol. 6, pp. 399-414.

Kane et al., "Quantitation of HIV-1 RNA in dried blood spots by the real-time NucliSENS EasyQ HIV-1 assay in Senegal", Journal of virological methods., (2008), vol. 148, pp. 291-295.

Amellal et al., "Evaluation of the use of dried spots and of different storage conditions of plasma for HIV-1 RNA quantification", HIV medicine, (2007), vol. 8, pp. 396-400.

Denniff et al., Effect of storage conditions on the weight and appearance of dried blood spot samples on various cellulose-based substrates., Bioanalysis., (2010), pp. 1817-1822, vol. 2(11).

Denniff et al., Effect of ambient humidity on the rate at which blood spots dry and the size of the spot produced., Bioanalysis., (2013), pp. 1863-1871, vol. 5.15.

Mei, "Dried blood spot sample collection, storage, and transportation", Dried Blood Spots: Applications and Techniques, (2014), pp. 21-31.

Golubovic et al., "Sorption properties for different types of molecular sieve and their influence on optimum dehumidification performance of disiccant wheels", International Journal of Heat and Mass Transfer, (2006), vol. 49, pp. 2802-2809.

Amsterdam et al., "The application of dried blood spot sampling in global clinical trials", Bioanalysis., (2010), vol. 2, No. 11, pp. 1783-1786.

Brindle et al., "Applications of Dried Blood Spots in General Human Health Studies", Dried Blood Spots: Applications and Techniques, (2014), pp. 114-129.

Kulmatycki et al., "Application of Dried Blood Spot Sampling in Clinical Pharmacology Trials and Therapeutic Drug Monitoring", Dried Blood Spots: Applications and Techniques, (2014), pp. 216-228.

Lakshmy et al., Role of dried blood spots in health and disease diagnosis in older adults., Bioanalysis., (2014), pp. 3121-3131, vol. 6 (23).

Lehmann et al., "Current and future use of "dried blood spot" analyses in clinical chemistry", Clinical chemistry and : Laboratory Medicine, (2013), vol. 51, No. 10, pp. 1897-1909.

Liang et al., Dried blood spot (DBS) sampling technique and its applications., CACS communications., (2010), pp. 23-27.

Deep et al., Dry Blood Spot Technique: A Review, Int J Pharm Sci Rev Res, (2012), vol. 15, No. 2, pp. 90-94.

Parker et al., "The use of the dried blood spot sample in epidemiological studies", Journal of clinical pathology, (1999), vol. 52, No. 9, pp. 633-639.

Dezateux et al., "Evaluating newborn screening programmes based on dried blood spots: future challenges", British Medical Bulletin, (1998), vol. 54, No. 4, pp. 877-890.

Wilcken et al., Screening for disease in the newborn: the evidence base for blood-spot screening., Pathology—Journal of the RCPA., (2012), pp. 73-79, vol. 44 (2).

Deglon et al., "Direct analysis of dried blood spots coupled with mass spectrometry: concepts and biomedical applications", Analytical and bioanalytical chemistry., (2012), vol. 402, pp. 2485-2498.

(56) References Cited

OTHER PUBLICATIONS

Desai et al., "Dried blood spot sampling analysis: recent advances and applications", Pharmaceutical, Biological, and Chemical Sciences, (2013), vol. 4, No. 4, pp. 34-44.
Henion et al., Microsample analyses via DBS: challenges and opportunities., Bioanalysis., (2013), pp. 2547-2565, vol. 5 (20).
Tsui et al., "Stability of Endogenous and Added RNA in Blood Specimens, Serum, and Plasma", Clinical chemistry, (2002), vol. 48, No. 10, pp. 1647-1653.
Frazao et al., "Unravelling the dynamics of RNA degradation by ribonuclease II and its RNA-bound complex", Nature, Sep. 2006, vol. 443, pp. 110-114.
Jorgez et al., "Recovery and amplification of placental RNA from dried maternal blood spots: utility for non-invasive prenatal diagnosis", Reproductive BioMedicine Online, (2006), vol. 13, No. 4, pp. 558-561.
Bauer et al., "Quantification of RNA degradation by semi-quantitative duplex and competitive RT-PCR: a possible indicator of the age of bloodstains?", Forensic Science International, (2003), vol. 138, pp. 94-103.
Weber et al., "Assessment of mRNA and microRNA Stabilization in Peripheral Human Blood for Multicenter Studies and Biobanks", Biomarker Insights, (2010), vol. 5, pp. 95-102.
Muller et al., "Improvement of molecular monitoring of residual disease in leukemias by bedside RNA stabilization", Leukemia, (2002), vol. 16, No. 12, pp. 2395-2399.
USDHHS, "Federal Register", (2001), vol. 66, No. 100, pp. 28526-28527.
Jager et al., Procedures and practices for the validation of bioanalytical methods using dried blood spots: a review., Bioanalysis., (2014), pp. 2481-2514, vol. 6(18).
Shenoy et al., "GBP5 Promotes NLRP3 Inflammasome Assembly and Immunity in Mammals", Science, Apr. 27, 2012, vol. 336, pp. 481-485.
Lang et al., "DUSP Meet Immunology: Dual Specificity MAPK Phosphatases in Control of the Inflammatory Response", The Journal of Immunology., (2006), vol. 177, No. 11, pp. 7497-7504.
Sebzda et al., "Transcription factor KLF2 regulates the migration of naive T cells by restricting chemokine receptor expression patterns", Nature Immunology., Mar. 2008, vol. 9., No. 3, pp. 292-300.
Barber et al., "GAPDH as a housekeeping gene: analysis of GAPDH mRNA expression in a panel of 72 human tissues", Physiol Genomics, (2005), vol. 21, No. 3, pp. 389-395.
Bland et al., "Statistical Methods for Assessing Agreement Between Two Methods of Clinical Measurement", Feb. 8, 1986, vol. 1, pp. 307-310.
Conover et al., "Rank Transformations as a Bridge Between Parametric and Nonparametric Statistics", The American Statistician, Aug. 1981, vol. 35, No. 3, pp. 124-129.
Taylor et al., P47 GTPASES: Regulators of Immunity to Intracellular Pathogens, Nature Reviews Immunology, Feb. 2004, vol. 4, pp. 100-109.
Jacobs et al., "NLRs, inflammasomes, and viral infection", Journal of Leukocyte Biology, Sep. 2012, vol. 92, pp. 469-477.
Pessenda Garcia, P. (Authorized officer), Partial European Search Report in corresponding European Application No. 21760028.7 mailed on Feb. 26, 2024, 23 pages.
Canadian Office Action in Canadian Application No. 3,169,541 mailed on Mar. 28, 2024, 3 pages.

METHODS, DEVICES, AND RELATED ASPECTS FOR COLLECTING AND STORING SAMPLES

CROSS-REFERENCE TO RELATED APPLICATIONS

This application claims priority to, and the benefit of, U.S. Provisional Patent Application Ser. Nos. 62/983,373, filed Feb. 28, 2020 and 63/027,224, filed May 19, 2020, the disclosures of which are incorporated herein by reference.

BACKGROUND

A wide array of sample types are used in various analytical processes. For example, biological samples, such as blood, sputum, and urine, among other sample types, are frequently analyzed for the presence of pathogens, biomarkers, or toxicants. In many applications, such samples are stored and transported from given collection sites to remote locations for analysis. In some cases, these samples are stored and transported in liquid, frozen, or dried forms. Many of these pre-existing sample storage and transport techniques suffer from various disadvantages, including high cost, contamination risk, instability, and limited portability.

Accordingly, there is a need for additional devices, and related aspects, for sample collection and storage that avoid these disadvantages.

SUMMARY

The present disclosure relates, in certain aspects, to devices, kits, systems, computer readable media, and methods of use in collecting and storing samples. In some embodiments, the sample collection devices disclosed herein are configured to store sample collection supports, such as sample collection cards (e.g., Whatman 903 dried blood spot (DBS) collection cards or the like). The sample collection devices disclosed herein are configured to protect samples from mechanical and environmental damage and to prevent sample contamination. The sample collection devices disclosed herein are also typically configured to rapidly dry samples using drying agents, such as molecular sieve desiccants. In addition, the sample collection devices disclosed herein are also generally fabricated to be portable and compact. These and other aspects will be apparent upon a complete review of the present disclosure, including the accompanying figures.

In certain aspects, the present disclosure provides a sample collection device that includes at least a first body structure portion that comprises at least one drying agent compartment configured to receive at least one drying agent, and at least a second body structure portion operably connected, or connectable, to the first body structure portion. The second body structure portion comprises at least one sample collection support compartment comprising one or more segments that communicate with the drying agent compartment at least when the first and second body structure portions are operably connected to one another in a closed position. The sample collection support compartment is configured to receive at least one sample collection support. The sample collection device also includes at least one sealing material disposed, or disposable, between at least sections of the first and second body structure portions at least when the first and second body structure portions are operably connected to one another in the closed position.

The sealing material substantially seals at least the drying agent compartment and the sample collection support compartment when the first and second body structure portions are operably connected to one another in the closed position. In addition, the sample collection device also includes at least one closure mechanism operably connected, or connectable, to the first and second body structure portions at least when the first and second body structure portions are operably connected to one another in the closed position. The closure mechanism is configured to maintain the first and second body structure portions in the closed position at least when the first and second body structure portions are operably connected to one another in the closed position with the sealing material disposed between the sections of the first and second body structure portions. Typically, a selected amount of the drying agent positioned in the drying agent compartment of the sample collection device is sufficient to effect substantial enzymatic inhibition and/or oxidation inhibition within the sample collection device when the sample collection device is in the closed position. In some embodiments, a kit includes the sample collection device.

In certain embodiments, the drying agent compartment comprises at least one frame structure that substantially surrounds at least regions of at least one sample collection support that comprise samples and maintains at least one gap between the regions of the sample collection support that comprise samples and at least one drying agent at least when the first and second body structure portions are operably connected to one another in the closed position with the sample collection support positioned in the sample collection support compartment and the drying agent positioned in the drying agent compartment. In some embodiments, the drying agent compartment comprises at least one retaining structure configured to retain at least one drying agent in the drying agent compartment when the drying agent is positioned in the drying agent compartment. In certain embodiments, the drying agent compartment comprises at least one retaining structure having one or more openings disposed therethrough, which openings communicate with the drying agent compartment. In certain embodiments, the drying agent compartment comprises at least one movable closure that is movable between at least open and closed positions. In some embodiments, the drying agent compartment comprises the drying agent.

In some embodiments, the second body structure portion comprises at least one retaining element structured to retain the sample collection support in the sample collection support compartment when the sample collection support compartment receives the sample collection support. In certain embodiments, the first and second body structure portions are operably connected to one another via at least one hinge structure. In some embodiments, the sample collection support compartment comprises the sample collection support.

In certain embodiments, the sealing material comprises at least one gasket. In some embodiments, at least portions of the sealing material are fabricated integral with the first body structure portion and/or the second body structure portion. In some embodiments, the first body structure portion comprises at least one protrusion and wherein the second body structure portion comprises at least one groove that is configured to receive at least a portion of the sealing material. In these embodiments, the protrusion is configured to compress the sealing material at least in the groove at least when the first and second body structure portions are operably connected to one another in the closed position with the sealing material disposed between the sections of the first and second body structure portions.

In some embodiments, the closure mechanism comprises at least one rotatable clamping structure. In some of these embodiments, the rotatable clamping structure comprises at least one latch element rotatably attached to the second body structure portion and wherein the first body structure portion comprises at least one ridge element that engages the latch element at least when the first and second body structure portions are operably connected to one another in the closed position and when the latch element and the ridge element are in a closed position relative to one another.

In some aspects, the present disclosure provides a kit that includes at least one sample collection device that comprises: at least a first body structure portion that comprises at least one drying agent compartment configured to receive at least one drying agent; at least a second body structure portion operably connected, or connectable, to the first body structure portion, which second body structure portion comprises at least one sample collection support compartment comprising one or more segments that communicate with the drying agent compartment at least when the first and second body structure portions are operably connected to one another in a closed position, which sample collection support compartment is configured to receive at least one sample collection support; at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions. The kit also includes one or more drying agents. In some embodiments, the kit further includes one or more sample collection supports.

In some aspects, the present disclosure provides a method of collecting a sample that includes placing at least an aliquot of the sample on a sample collection support, and positioning the sample collection support in a sample collection support compartment of a sample collection device. The sample collection device comprises: at least a first body structure portion that comprises at least one drying agent compartment configured to receive at least one drying agent; at least a second body structure portion operably connected, or connectable, to the first body structure portion, which second body structure portion comprises the sample collection support compartment, which sample collection support compartment comprises one or more segments that communicate with the drying agent compartment at least when the first and second body structure portions are operably connected to one another in a closed position; at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions. The method also includes positioning the drying agent in the drying agent compartment of the sample collection device, and closing the closure mechanism of the sample collection device to maintain the first and second body structure portions in the closed position with the sealing material disposed between the sections of the operably connected first and second body structure portions, thereby collecting the sample.

In some embodiments, the sample comprises blood obtained from a subject. In certain embodiments, the sample collection support comprises a sample collection card. In some embodiments, the method includes positioning the drying agent in the drying agent compartment before positioning the sample collection support in the sample collection support compartment of the sample collection device. In certain embodiments, the method further includes storing the sample in the sample collection device. In some embodiments, the method further includes analyzing the sample after opening the sample collection device.

In another aspect, the present disclosure provides a method of selecting an amount of at least one drying agent for a drying application at least partially using a computer. The method includes estimating a quantity of water associated with one or more elements disposed at least partially within a sample collection device to produce at least one water quantity estimate, and determining one or more physical properties of the elements disposed at least partially within the sample collection device to produce at least one set of physical properties. The method also includes selecting a drying rate, a drying duration, and/or a final humidity level for at least one of the elements to produce at least one set of drying parameters, and determining the amount of the drying agent to achieve the set of drying parameters using the water quantity estimate and the set of physical properties, thereby selecting the amount of the drying agent for the drying application. In certain embodiments, the methods disclosed herein include performing each step of the method using the computer. In some embodiments, the methods disclosed herein include placing at least an aliquot of the sample on a sample collection support; positioning the sample collection support in a sample collection support compartment of the sample collection device; positioning the selected amount of the drying agent in a drying agent compartment of the sample collection device; drying the sample in the sample collection device; storing the sample in the sample collection device; and/or analyzing the sample.

In another aspect, the present disclosure provides a method of storing an item (and a sample that the item comprises in certain embodiments) within a sample collection device. The method includes positioning at least one item in at least one compartment (e.g., a sample collection support compartment) of the sample collection device. The method also includes positioning a selected amount of at least one drying agent in a drying agent compartment of the sample collection device. The selected amount of the drying agent positioned in the drying agent compartment of the sample collection device is sufficient to effect substantial enzymatic inhibition and/or oxidation inhibition within the sample collection device at a selected drying rate, a selected drying duration, and/or a selected final humidity level when the sample collection device is a substantially airtight closed position. The method also includes closing a closure mechanism of the sample collection device to maintain the sample collection device in the substantially airtight closed position.

In another aspect, the present disclosure provides a method of storing an item within a sample collection device. The method also includes positioning at least one item in at least one compartment of the sample collection device. The method also includes closing a closure mechanism of the sample collection device to maintain the sample collection device in the substantially airtight closed position with the item disposed within the sample collection device. The method also includes drying the item within the sample collection device at a selected drying rate, a selected drying duration, and/or a selected final humidity level sufficient to effect substantial enzymatic inhibition and/or oxidation inhibition within the sample collection device.

In certain embodiments, the methods disclosed herein include selecting an amount of the drying agent to position in the drying agent compartment of the sample collection device by: estimating a quantity of water associated with one or more elements disposed at least partially within a sample collection device to produce at least one water quantity estimate; determining one or more physical properties of the elements disposed at least partially within the sample collection device to produce at least one set of physical properties; selecting a drying rate, a drying duration, and/or a final humidity level for at least one of the elements to produce at least one set of drying parameters; and determining the amount of the drying agent to achieve the set of drying parameters using the water quantity estimate and the set of physical properties. In some embodiments, the methods disclosed herein include positioning an amount of the drying agent in the drying agent compartment of the sample collection device that is sufficient to effect substantial enzymatic inhibition and/or oxidation inhibition within the sample collection device when the first and second body structure portions are in the closed position with the sealing material disposed between the sections of the operably connected first and second body structure portions. In some of these methods, the amount of the drying agent positioned in the drying agent compartment of the sample collection device is sufficient to effect substantial enzymatic inhibition and/or oxidation inhibition within the sample collection device at a selected drying rate, a selected drying duration, and/or a selected final humidity level.

In some embodiments, the methods disclosed herein include determining amounts of multiple drying agents to use together in a drying agent mixture to achieve the set of drying parameters using the water quantity estimate and the set of physical properties for the drying application. In certain embodiments, the methods disclosed herein include determining a ratio of an amount of a first drying agent to an amount of a second drying agent when determining the amounts of the multiple drying agents to use together in the drying agent mixture. In some embodiments, the methods disclosed herein include selecting the drying rate, the drying duration, and/or the final humidity level for the at least one of the elements using at least one mathematical calculation. In certain embodiments of the methods disclosed herein, the amount of the drying agent is sufficient to effect substantial enzymatic inhibition and/or oxidation inhibition within the sample collection device during use of the sample collection device.

In certain embodiments, the methods disclosed herein include positioning a selected amount of at least one drying agent in a drying agent compartment of the sample collection device. The selected amount of the drying agent positioned in the drying agent compartment of the sample collection device is sufficient to effect substantial enzymatic inhibition and/or oxidation inhibition within the sample collection device at the selected drying rate, the selected drying duration, and/or the selected final humidity level. In some embodiments, the methods disclosed herein include selecting an amount of the drying agent to position in the drying agent compartment of the sample collection device by: estimating a quantity of water associated with one or more elements disposed at least partially within a sample collection device to produce at least one water quantity estimate; determining one or more physical properties of the elements disposed at least partially within the sample collection device to produce at least one set of physical properties; selecting a drying rate, a drying duration, and/or a final humidity level for at least one of the elements to produce at least one set of drying parameters; and determining the amount of the drying agent to achieve the set of drying parameters using the water quantity estimate and the set of physical properties.

In some embodiments, the methods disclosed herein include processing the item (and a sample that the item comprises in certain embodiments) stored within the sample collection device. In certain embodiments, the methods disclosed herein include analyzing the item using at least one analytical technique after drying the item while the item is stored within the sample collection device. In some embodiments, the methods disclosed herein include analyzing the item using at least one analytical technique after drying the item and opening the sample collection device. In certain embodiments of the methods disclosed herein, the analytical technique is selected from the group consisting of: a gas chromatography-mass spectrometry (GC-MS) technique, a mass spectrometry (MS) technique, a proton-transfer-reaction mass spectrometry (PTR-MS) technique, and a gas chromatography-flame ionization detector (GC-FID) technique.

In certain embodiments, the methods disclosed herein include effecting the substantial enzymatic inhibition and/or oxidation inhibition within the sample collection device within about 10 minutes of closing the closure mechanism of the sample collection device. In some embodiments, the methods disclosed herein include effecting the substantial enzymatic inhibition and/or oxidation inhibition within the sample collection device in the absence of applying a negative pressure (e.g., via an operably connected vacuum pump or the like) or a charge (e.g., via an operably connected electrode or the like) to the item stored within the sample collection device. In certain embodiments of the methods disclosed herein, the item comprises at least one sample collection support and wherein the method comprises placing at least an aliquot of a sample on the sample collection support before, during, and/or after positioning the sample collection support in at least one compartment of the sample collection device. Typically, drying comprises removing substantially all water molecules from (e.g., dehydrating) the item. In some embodiments of the methods disclosed herein, the drying agent comprises one or more reagents selected from the group consisting of: a boronic acid reagent ( ), a grignard reagent, an organozinc reagent, an organosilicon reagent, an organotin reagent, and derivatives thereof.

In some embodiments of the methods disclosed herein, the quantity of water associated with the elements comprises a number of moles of water associated with the elements. In certain embodiments, the methods disclosed herein include estimating the quantity of water associated with at least one of the elements using the equation:

$$PV=nRT,$$

where P is pressure within the sample collection device, Vis volume within the sample collection device, n is number of moles of water, R is the ideal gas constant (i.e., 8.31446261815324 $J \cdot K^{-1} \cdot mol^{-1}$ expressed in SI units), and T is temperature within the sample collection device. In some embodiments of the methods disclosed herein, the physical properties are selected from the group consisting of: a given element, a drying agent type, a sample type, a sample collection device material, a kinetic measure of water transfer from a given element to the drying agent, a temperature of a given element, a temperature within the sample collection device, a volume within the sample collection device, a humidity level within the sample collection device, a sealing material type, a pressure level within the sample collection device, a sample collection support material, a gas type within the sample collection device, a liquid type within the sample collection device, a solid type within the sample collection device, and a phase type mixture within the sample collection device. In some embodiments of the methods disclosed herein, the drying agent is selected from the group consisting of: silica, activated charcoal, calcium sulfate, calcium chloride, molecular sieves, alcohols, and acetones.

In some embodiments of the methods disclosed herein, the sample collection device comprises at least a first body structure portion that comprises at least one drying agent compartment configured to receive at least one drying agent, and at least a second body structure portion operably connected, or connectable, to the first body structure portion. The second body structure portion comprises at least one sample collection support compartment comprising one or more segments that communicate with the drying agent compartment at least when the first and second body structure portions are operably connected to one another in a closed position. The sample collection support compartment is configured to receive at least one sample collection support. The sample collection device also includes at least one sealing material disposed, or disposable, between at least sections of the first and second body structure portions at least when the first and second body structure portions are operably connected to one another in the closed position. The sealing material substantially seals at least the drying agent compartment and the sample collection support compartment when the first and second body structure portions are operably connected to one another in the closed position. In addition, the sample collection device also includes at least one closure mechanism operably connected, or connectable, to the first and second body structure portions at least when the first and second body structure portions are operably connected to one another in the closed position. The closure mechanism is configured to maintain the first and second body structure portions in the closed position at least when the first and second body structure portions are operably connected to one another in the closed position with the sealing material disposed between the sections of the first and second body structure portions.

In some embodiments of the methods disclosed herein, the elements are selected from the group consisting of: a sample, a non-sample material, a liquid, and a gas. In certain of these embodiments, for example, the sample comprises blood obtained from a subject. In some of these embodiments, the non-sample material comprises a sample collection support (e.g., a sample collection card, such as a DBS card).

In another aspect, the present disclosure provides a system that includes at least one controller that comprises, or is capable of accessing, computer readable media comprising non-transitory computer-executable instructions which, when executed by at least one electronic processor perform at least: estimating a quantity of water associated with one or more elements disposed at least partially within a sample collection device to produce at least one water quantity estimate; determining one or more physical properties of the elements disposed at least partially within the sample collection device to produce at least one set of physical properties; selecting a drying rate, a drying duration, and/or a final humidity level for at least one of the elements to produce at least one set of drying parameters; and determining an amount of at least one drying agent to achieve the set of drying parameters using the water quantity estimate and the set of physical properties.

In yet another aspect, the present disclosure provides a computer readable media comprising non-transitory computer-executable instructions which, when executed by at least one electronic processor perform at least: estimating a quantity of water associated with one or more elements disposed at least partially within a sample collection device to produce at least one water quantity estimate; determining one or more physical properties of the elements disposed at least partially within the sample collection device to produce at least one set of physical properties; selecting a drying rate, a drying duration, and/or a final humidity level for at least one of the elements to produce at least one set of drying parameters; and determining an amount of at least one drying agent to achieve the set of drying parameters using the water quantity estimate and the set of physical properties.

In some embodiments of the systems or computer readable media disclosed herein, the non-transitory computer-executable instructions which, when executed by the electronic processor perform at least: determining a ratio of an amount of a first drying agent to an amount of a second drying agent when determining the amounts of multiple drying agents to use together in a drying agent mixture. In certain embodiments of the systems or computer readable media disclosed herein, the non-transitory computer-executable instructions which, when executed by the electronic processor perform at least: determining the amount of the drying agent that is sufficient to effect substantial enzymatic inhibition and/or oxidation inhibition within the sample collection device during use of the sample collection device.

In certain aspects, the present disclosure provides methods of drying an item in either a liquid or solid form in a sample collection device comprising the steps of: a) positioning the item in the sample collection device comprising an amount of at least one drying agent sufficient to dry the item; b) positioning a closure mechanism in a substantially airtight closed position, thereby producing a substantially airtight interior of the sample collection device; and drying the item within the sample collection device.

The methods of drying an item in either a liquid or solid form of the present invention are carried out in a sample collection device. In certain embodiments, the sample collection device comprises at least a first body structure portion that comprises at least one drying agent compartment configured to receive at least one drying agent; and 2) at least one closure mechanism operably connected to the first body structure portion.

In another embodiment, the sample collection device comprises: a) at least a first body structure portion that comprises at least one drying agent compartment configured to receive at least one drying agent; b) at least a second body structure portion operably connected, or connectable, to the first body structure portion, which second body structure portion comprises at least one sample collection support compartment comprising one or more segments that communicate with the drying agent compartment at least when the first and second body structure portions are operably connected to one another in a closed position, which sample collection support compartment is configured to receive at least one sample collection support; c) at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and d) at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions.

In certain embodiments, the sample collection device comprises an amount of at least one drying agent sufficient to dry the item. In other embodiments, drying is accomplished without applying a negative pressure to the interior of the sample collection device.

The methods of drying an item in either liquid or solid form comprise reducing the relative humidity in the interior of the sample collection device to less than about 15%, 12%, 10%, 8%, 5%, 4%, 3%, 2%, 1%, 0.5%, 0.2%, 0.1%, 0.05%, 0.02% or 0.01% relative humidity. In one embodiment, the methods of drying an item in either liquid or solid form comprise removal of substantially all detectable moisture from the sample. In one particular embodiment, the removal of substantially all detectable moisture from the item is determined by a stable measurement using a resistance sensor.

In certain embodiments, the methods of the present disclosure comprise the drying of an item comprising an environmental or biological sample.

The methods of the present disclosure further comprise analyzing the item for at least one analyte. In certain embodiments, the at least one analyte is a xenobiotic or metabolite. In another embodiment, the at least one analyte is a nucleic acid, protein, lipid or carbohydrate. In another embodiment, the nucleic acid is RNA or DNA. In yet another embodiment, the nucleic acid is RNA.

The drying time and rate of drying is related to the volume of the sample collection device, the volume of liquid in the item, the nature of the physical properties of the item, the type and amounts of at least one drying agent, the temperature and humidity of the drying environment. A person of ordinary skill in the art could, using the disclosures herein, adjust the type and amount of at least one drying agent in a particular sample collection device in a particular drying environment for a particular item to increase the drying rate or reduce the time necessary to achieve a particular level of humidity in the sample collection device, or reduce the time necessary to dry an item or reduce the time necessary to remove substantially all detectable moisture from the item.

An amount of at least one drying agent is placed into the sample collection device sufficient to dry an item. To determine an amount of at least one drying agent sufficient to dry an item or achieve a particular humidity level, a person of ordinary skill in the art need simply measure the humidity in the container after a specified amount of time using a sensor placed in the sample collection device in the airtight closed position or alternatively a sensor placed in a clear, sealable bag or other clear, airtight compartment (such that the sensor is visible through the sealable bag or other clear, airtight compartment) with the sample collection device in an open position. The amount of the at least one drying agent can be increased empirically to determine the amount sufficient to dry an item or achieve a particular humidity level. Once the amount of at least one drying agent sufficient to dry a particular item is achieved, this amount of at least one drying agent may be used in a particular sample collection device for drying that item without the need to make further measurements.

In certain embodiments, an amount of at least one drying agent may be added to a sample collection device in excess of the amount sufficient to dry an item. In particular, an amount of at least one drying agent in excess of the amount sufficient to dry an item may be added to a sample collection device to account for atmospheric water introduced into the sample collection device upon re-opening and re-closing. The average opening time, average humidity levels and number of anticipated re-opening/re-closing cycles may be used to calculate the amount of additional water that may be introduced into the sample collection device.

In one embodiment, the disclosed methods provide a method for drying an item comprising one or more dried blood spots by reducing the relative humidity in the interior of a sample collection device to 0.01% after about 300, 400, 500 or 600 minutes, when the item is dried in an environment at 25° C. and 65% relative humidity. In another embodiment, the removal of substantially all detectable moisture from the at least one dried blood spot is achieved in about 60, 90, or 120 minutes.

In a further embodiment, the disclosed methods provide methods for preserving an analyte in an item in either a liquid or solid form in a sample collection device comprising the steps of a) positioning the item in the sample collection device, the sample collection device comprises at least a first body structure portion that comprises at least one drying agent compartment configured to receive at least one drying agent; and at least one closure mechanism operably connected to the first body structure portion; and an amount of at least one drying agent sufficient to dry the item; b) positioning the at least one closure mechanism in a substantially airtight closed position, thereby producing a substantially airtight interior of the sample collection device; and c) removing substantially all detectable moisture from the item.

In one embodiment, the disclosed methods of preserving an analyte in an item are achieved without applying a negative pressure to the interior of the sample collection device. In another embodiment, the removal of substantially all detectable moisture from the item is determined by a stable measurement using a resistance sensor.

In yet another embodiment, the sample collection device in the methods of preserving an analyte in an item comprises: a) at least a first body structure portion that comprises at least one drying agent compartment configured to receive at least one drying agent; b) at least a second body structure portion operably connected, or connectable, to the first body structure portion, which second body structure portion comprises at least one sample collection support compartment comprising one or more segments that communicate with the drying agent compartment at least when the first and second body structure portions are operably connected to one another in a closed position, which sample collection support compartment is configured to receive at least one sample collection support; c) at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and d) at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions.

BRIEF DESCRIPTION OF THE DRAWINGS

The accompanying drawings, which are incorporated in and constitute a part of this specification, illustrate certain embodiments, and together with the written description, serve to explain certain principles of the methods, devices, kits, systems, and related computer readable media disclosed herein. The description provided herein is better understood when read in conjunction with the accompanying drawings which are included by way of example and not by way of limitation. It will be understood that like reference numerals identify like components throughout the drawings, unless the context indicates otherwise. It will also be understood that some or all of the figures may be schematic representations for purposes of illustration and do not necessarily depict the actual relative sizes or locations of the elements shown.

DEFINITIONS

Figure 1A:
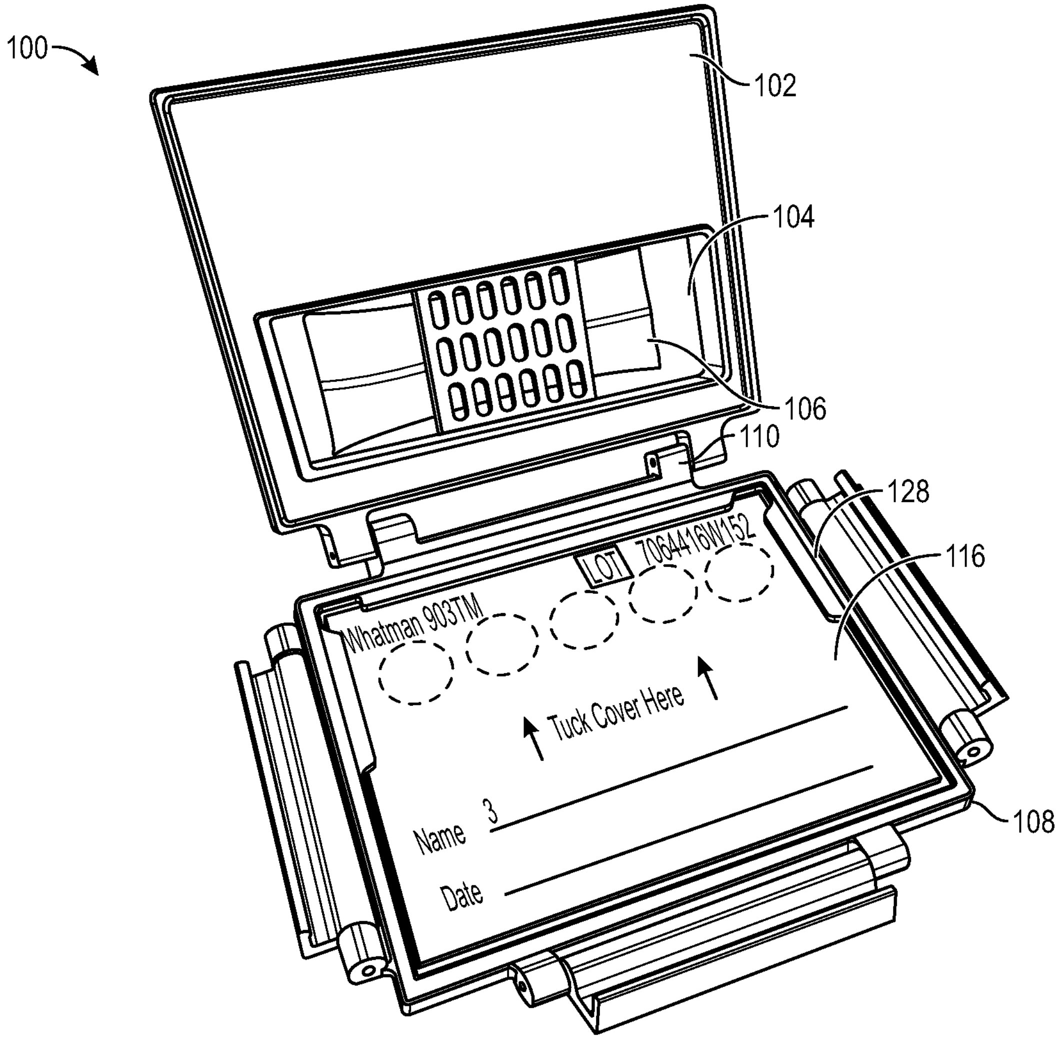
FIG. 1A schematically depicts a sample collection device with first and second body structure portions in an open position and having a sample collection support positioned in a sample collection support compartment from a perspective view according to an exemplary embodiment.
Figure 1B:
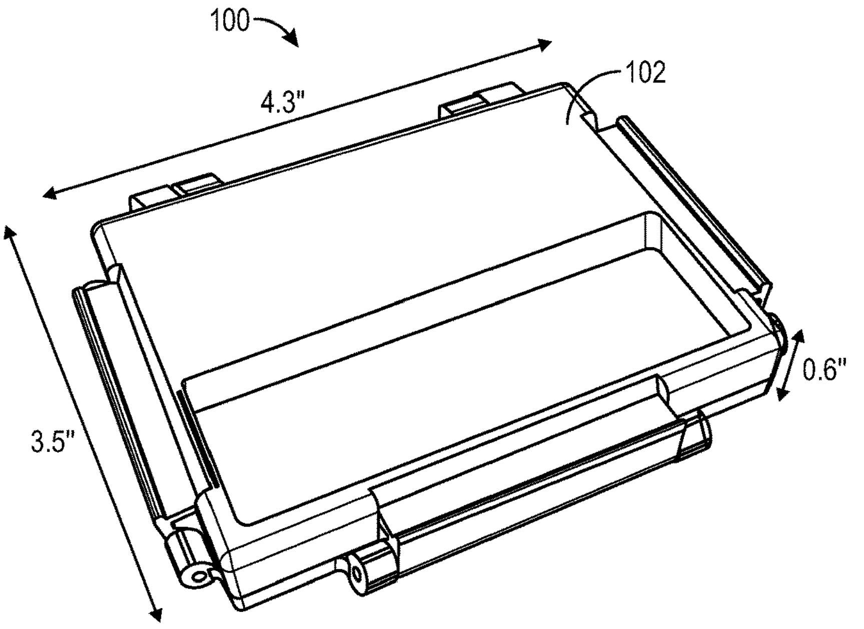
FIG. 1B schematically depicts the sample collection device from FIG. 1A with the first and second body structure portions in a closed position from a perspective view.
Figure 1C:
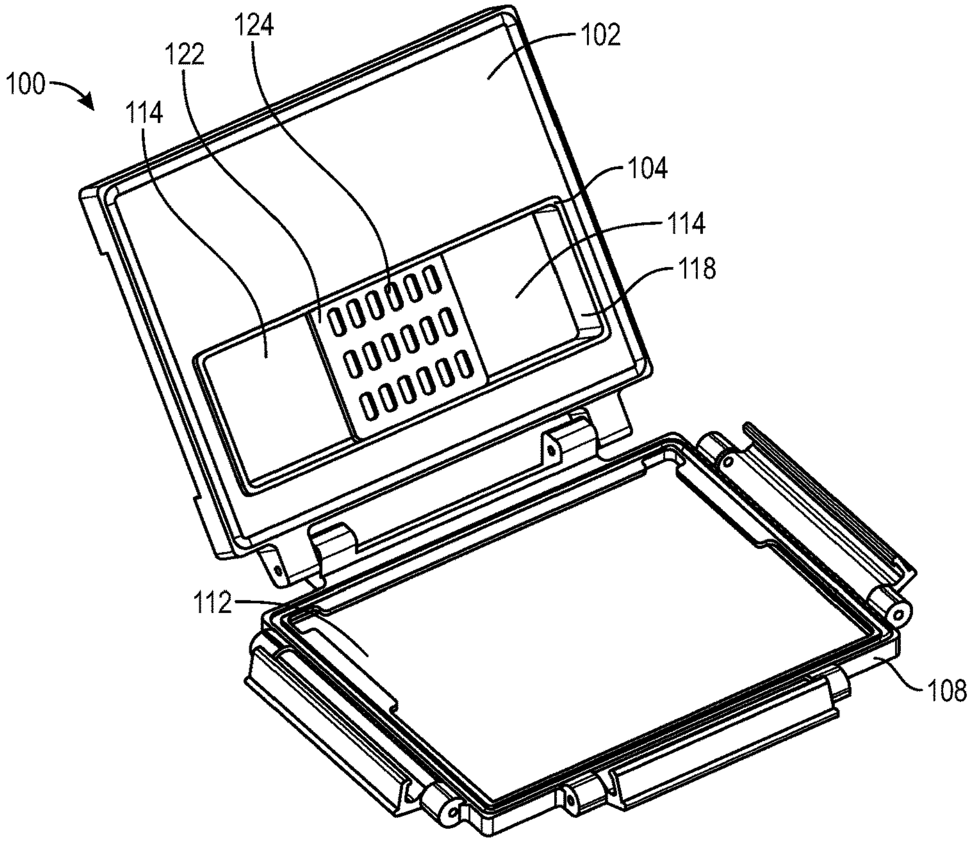
FIG. 1C schematically depicts the sample collection device from FIG. 1A without having a sample collection support positioned in the sample collection support compartment from a perspective view.
Figure 1D:
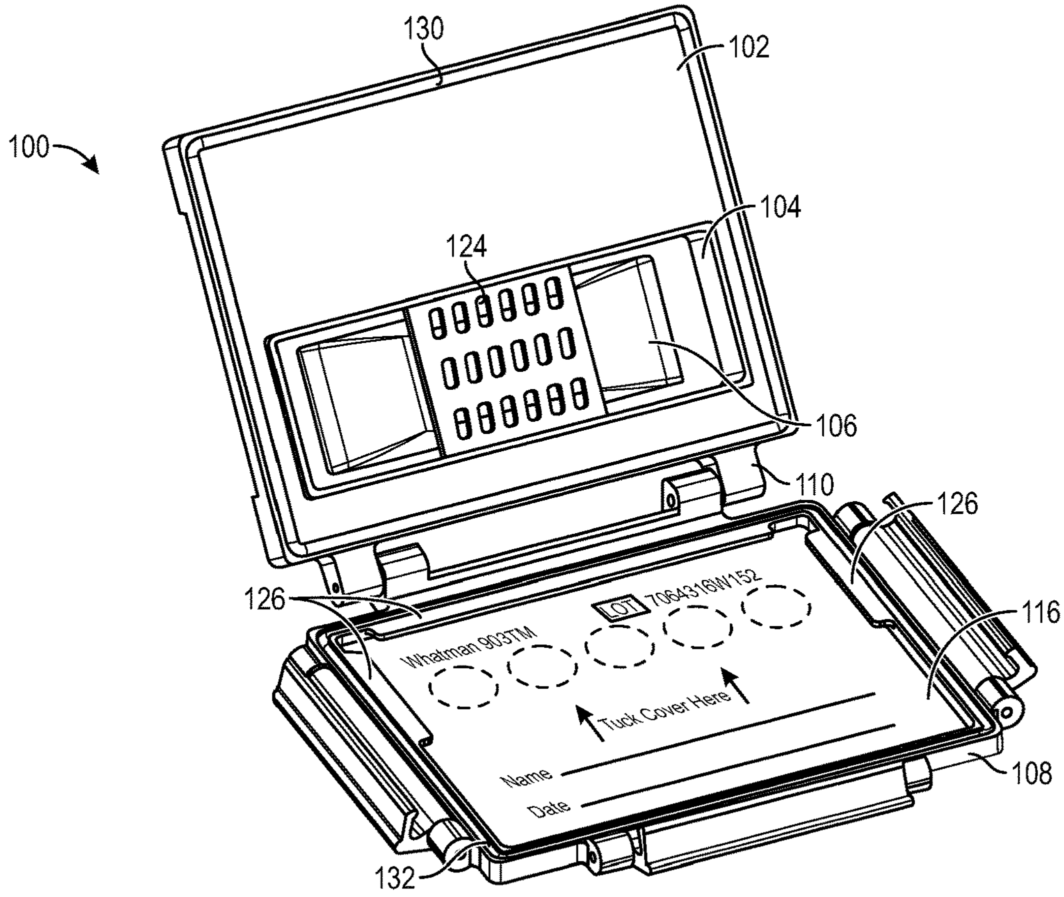
FIG. 1D schematically depicts the sample collection device from FIG. 1A with a sample collection support positioned in the sample collection support compartment and a packet containing drying agent positioned in a drying agent compartment from a perspective view.
Figure 1E:
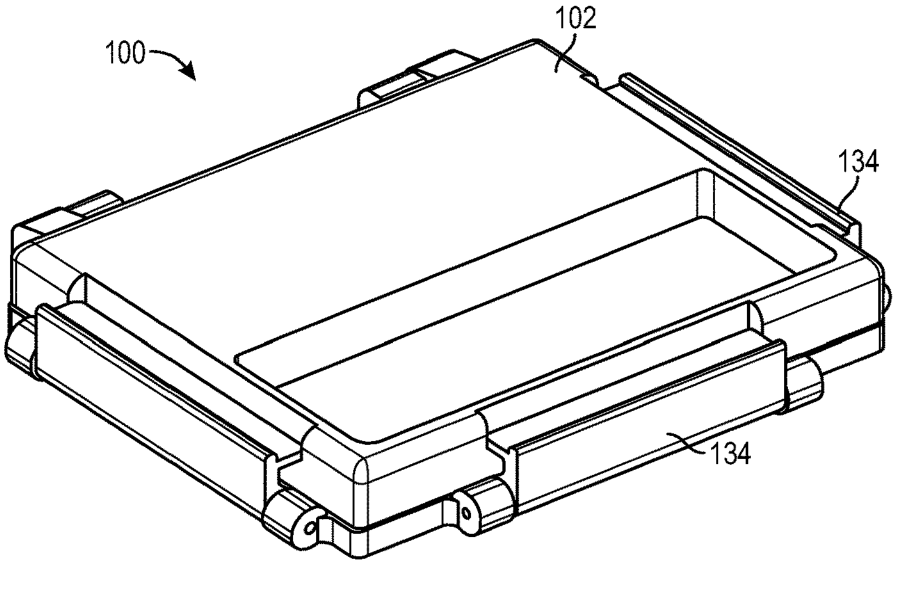
FIG. 1E schematically depicts the sample collection device from FIG. 1A with the first and second body structure portions in a closed position from a perspective view.
Figure 1G:
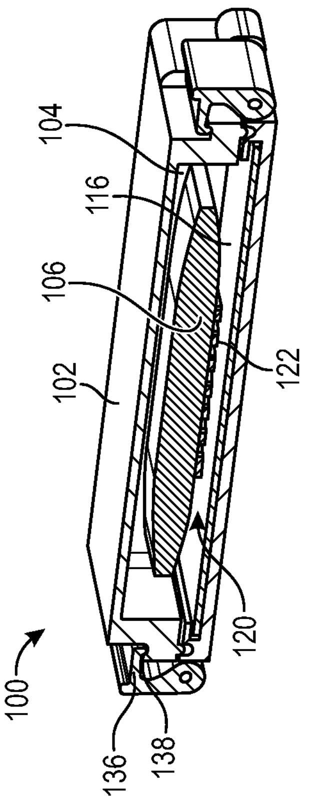
FIG. 1G schematically depicts the sample collection device from FIG. 1A with a sample collection support positioned in the sample collection support compartment and a packet containing drying agent positioned in a drying agent compartment from a sectional view.
Figure 1F:
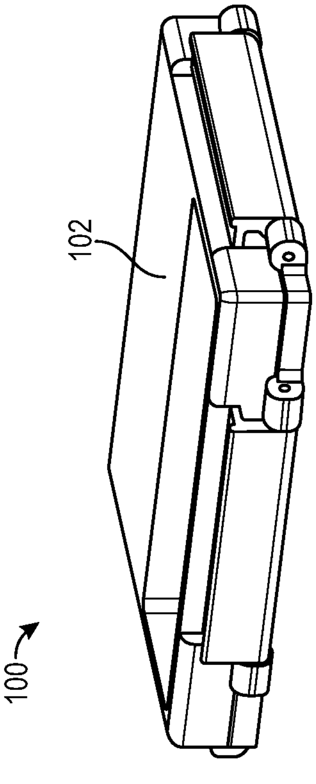
FIG. 1F schematically depicts the sample collection device from FIG. 1A with the first and second body structure portions in a closed position from a perspective view.
Figure 1H:
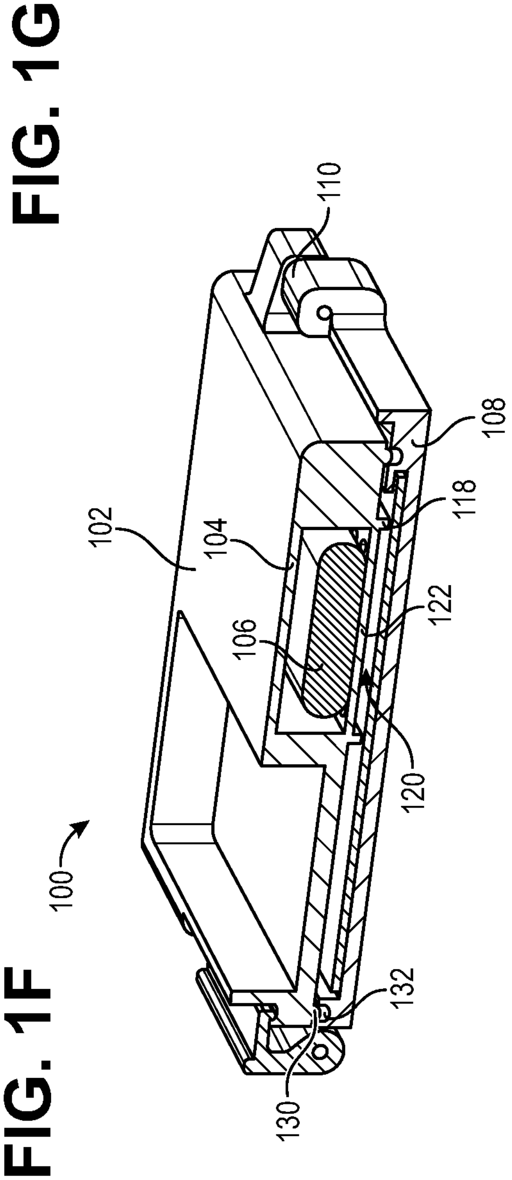
FIG. 1H schematically depicts the sample collection device from FIG. 1A with a sample collection support positioned in the sample collection support compartment and a packet containing drying agent positioned in a drying agent compartment from a sectional view.
Figure 2B:
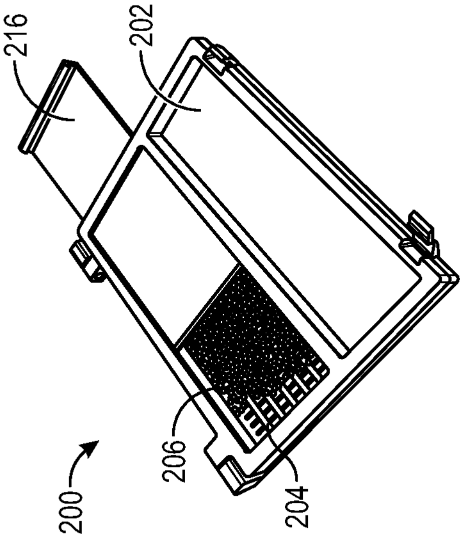
FIG. 2B schematically depicts the sample collection device from FIG. 2A with the movable closure of the drying agent compartment in an open position and drying agent disposed in the drying agent compartment from a perspective view.
Figure 2D:
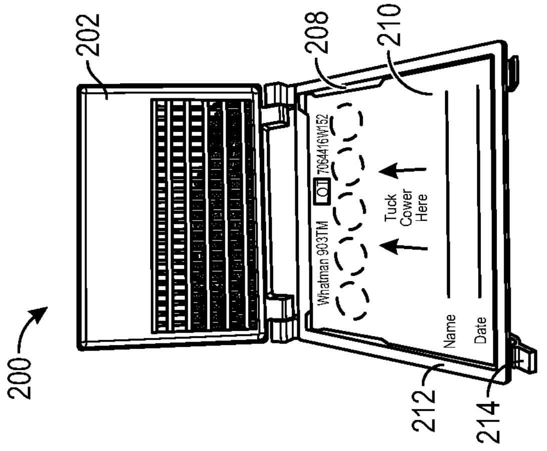
FIG. 2D schematically depicts the sample collection device from FIG. 2A with first and second body structure portions in an open position and having a sample collection support positioned in a sample collection support compartment from a perspective view.
Figure 2A:
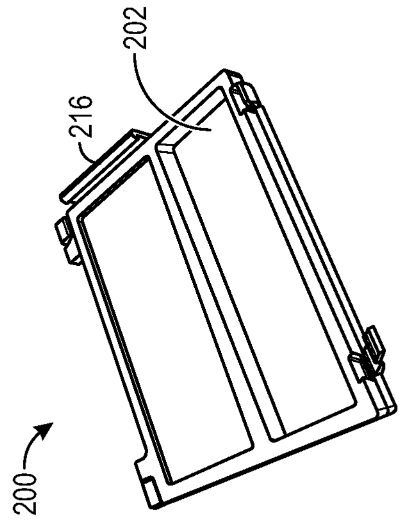
FIG. 2A schematically depicts a sample collection device with first and second body structure portions in a closed position and a movable closure of a drying agent compartment in a closed position from a perspective view according to an exemplary embodiment.
Figure 2C:
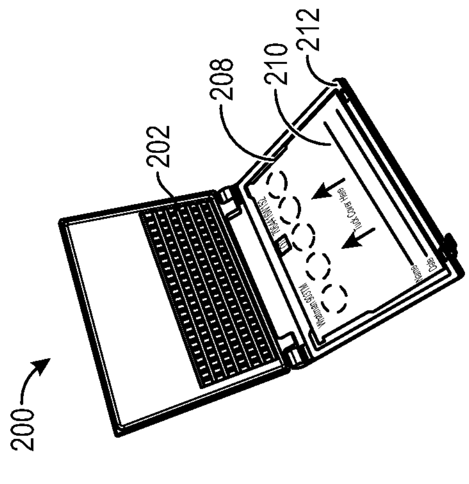
FIG. 2C schematically depicts the sample collection device from FIG. 2A with first and second body structure portions in an open position and having a sample collection support positioned in a sample collection support compartment from a perspective view.

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus, for example, a reference to "a method" includes one or more methods, and/or steps of the type described herein and/or which will become apparent to those persons skilled in the art upon reading this disclosure and so forth.

It is also to be understood that the terminology used herein is for the purpose of describing particular embodiments only, and is not intended to be limiting. Further, unless defined otherwise, all technical and scientific terms used herein have the same meaning as commonly understood by one of ordinary skill in the art to which this disclosure pertains. In describing and claiming the methods, devices, kits, and component parts, the following terminology, and grammatical variants thereof, will be used in accordance with the definitions set forth below.

About: As used herein, "about" or "approximately" or "substantially" as applied to one or more values or elements of interest, refers to a value or element that is similar to a stated reference value or element. In certain embodiments, the term "about" or "approximately" or "substantially" refers to a range of values or elements that falls within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value or element unless otherwise stated or otherwise evident from the context (except where such number would exceed 100% of a possible value or element).

Communicate: As used herein, "communicate" refers to the direct or indirect transfer or transmission, and/or capability of directly or indirectly transferring or transmitting, something at least from one area to another area.

Enzymatic Inhibition: As used herein, "enzymatic inhibition" at least in the context of sample collection devices refers to the inactivation of one or more enzymes disposed within a given collection device.

Oxidation Inhibition: As used herein, "oxidation inhibition" at least in the context of sample collection devices refers to the prevention of one or more oxidation reactions from occurring within a given collection device.

Sample: As used herein, "sample" means anything capable of being collected and stored in a device disclosed herein. Exemplary samples include environmental samples and biological samples in liquid or dried states. Some examples of biological samples, include nucleic acids (DNA/RNA), whole blood (e.g., in the form of dried blood spots (DBS) or the like), platelets, serum, plasma, red blood cells, white blood cells or leucocytes, endothelial cells, metabolites, tissue biopsies, body tissues, cerebrospinal fluid, synovial fluid, lymphatic fluid, ascites fluid, interstitial or extracellular fluid (e.g., fluid from intercellular spaces), gingival fluid, crevicular fluid, bone marrow, pleural effusions, cerebrospinal fluid, saliva, mucous, sputum, semen, sweat, stool, and urine.

Subject: As used herein, "subject" refers to an animal, such as a mammalian species (e.g., human) or avian (e.g., bird) species. More specifically, a subject can be a vertebrate, e.g., a mammal such as a mouse, a primate, a simian or a human. Animals include farm animals (e.g., production cattle, dairy cattle, poultry, horses, pigs, and the like), sport animals, and companion animals (e.g., pets or support animals). A subject can be a healthy individual, an individual that has or is suspected of having a disease or a predisposition to the disease, or an individual that is in need of therapy or suspected of needing therapy. The terms "individual" or "patient" are intended to be interchangeable with "subject." For example, a subject can be an individual who has been diagnosed with having a disease, disorder, or condition, is going to receive a therapy for a disease, disorder, or condition, and/or has received at least one therapy for a disease, disorder, or condition.

DETAILED DESCRIPTION

The present disclosure provides devices, kits, and related methods for dried specimen or sample collection under extreme environmental ranges and long-term preservation of those samples even when stored at room temperature. In certain embodiments, algorithms can be applied to the airtight sample collection devices or containers disclosed herein to further effect control of sample drying rates and reduce relative humidity (RH) levels below detectable limits (e.g., <0.01% RH). The airtight sample collection devices disclosed herein are compatible with a wide variety of chemistries to remove water and gases (e.g., oxygen) to thereby permit the long-term storage of collected samples with reduced analyte degradation rates for improved sample stability.

In general, many compounds degrade over time in biological specimens or samples due to oxidation or enzymatic activity. Since enzymes typically cannot function without water, the application of the airtight containers or devices disclosed herein essentially stops enzymatic activity. Further, the devices and related aspects disclosed herein preserve samples from suffering loss due to the growth of contaminating organisms by achieving and maintaining a near moisture free environment, even under extreme conditions. The devices and related aspects disclosed herein allow for collection of samples in nontraditional settings outside of the clinic or lab, thereby enabling field sampling in a standardized and reproducible manner, which can substantially expand the provision and quality of health services to remote and otherwise vulnerable populations.

In a given opaque, airtight container or device disclosed herein, there are typically no sources of water during storage other than a) the sample(s), b) the hydration of any materials placed in the container, and/or c) the air within the closed container. Some embodiments involve using a calculation that is based upon the ideal gas equation (PV=nRT, where P=pressure, V=volume, n=moles, R=the ideal gas constant and T=temperature) as it relates to a), b), and c) as individual elements, referenced above, and the n for each element is the moles of water (na, nb, nc) and respective pressures and volumes (equal to the volume of the container) and relating the surface area of each element, and the kinetics of water removal from the air in the container and transfer to the desiccant to predict an optimized amount of desiccant to achieve different drying rates and final humidity levels in the closed sample collection devices disclosed herein. In some embodiments, variables, such as relative humidity (RH) (relates to the moles of water in the air of a given closed container), temperature within the container, and/or drying rate of samples (e.g., blood spots) are evaluated to determine the amount of desiccant or other drying agent to use in a given application of a device or container disclosed herein. In some embodiments, the sample collection devices disclosed herein are fabricated from metallic materials that can bind oxygen and further stabilize a given sample from oxidation during storage (e.g., if brushed to expose a fresh metal surface before a given device is sealed or closed in certain embodiments). Sample collection methods and related aspects are also described in, for example, Freeman, Jeffrey David (2017). IMPROVED METHODS IN THE COLLECTION OF BIOLOGICAL SAMPLES FOR COMPLEX OCCUPATIONAL AND ENVIRONMENTAL SETTINGS (Doctoral dissertation). Johns Hopkins University, Baltimore, Maryland, U.S.A., which is incorporated by reference herein in its entirety.

To illustrate, FIGS. 1A-1H schematically depicts a sample collection device (e.g., an opaque, airtight container) from various views according to an exemplary embodiment. As shown, sample collection device 100 includes first body structure portion 102 (shown as a lid) that includes drying agent compartment 104 configured to receive drying or dehydrating agent 106 (shown as a packet containing a desiccant). Essentially any desiccant or other hygroscopic substance is optionally used to effect the drying of samples collected in sample collection device 100. Some examples of suitable drying agents, include silica, activated charcoal, calcium sulfate, calcium chloride, molecular sieves (e.g., zeolites), alcohols, and acetones, among others. Typically, experimentally optimized amounts of desiccants are utilized to remove essentially all moisture from the sample collection devices disclosed herein when in a closed position. Sample collection device 100 also includes second body structure portion 108 (shown as a base tray) operably connected to first body structure portion 102 via hinge structures 110. Although not shown, first and second body structure portions are detachable or selectively connectable to one another in some embodiments. Second body structure portion 108 includes sample collection support compartment 112 comprising one or more segments 114 that communicate with the drying agent compartment 104 at least when the first and second body structure portions are operably connected to one another in a closed position. Sample collection support compartment 112 is configured to receive sample collection support 116 (shown as a sample collection card, such as a Whatman 903 dried blood spot (DBS) collection card). Second body structure portion 108 also includes retaining element 126 (shown as a retaining ridge structure) structured to retain sample collection support 116 in sample collection support compartment 112 when sample collection support compartment 112 receives sample collection support 116.

As also shown, drying agent compartment 104 includes frame structure 118 that substantially surrounds at least regions of sample collection support 116 that comprise samples (disposed in the dashed circle regions on sample collection support 116) and maintains gap 120 between the regions of sample collection support 116 that comprise samples and drying agent 106 at least when the first and second body structure portions are operably connected to one another in the closed position with sample collection support 116 positioned in sample collection support compartment 112 and drying agent 106 positioned in drying agent compartment 104. Drying agent compartment 104 also includes retaining structure 122, which is configured to retain drying agent 106 in drying agent compartment 104 when drying agent 106 is positioned in drying agent compartment 104. As shown, retaining structure 122 includes openings 124 (shown as an array of holes disposed through retaining structure 122) disposed therethrough. Openings 124 communicate with drying agent compartment 104.

Sample collection device 100 also includes sealing material 128 (shown as a gasket) disposed between at least sections of the first and second body structure portions at least when the first and second body structure portions are operably connected to one another in the closed position. Essentially any sealing material (e.g., paper, rubber, felt, neoprene, silicone, metal, cork, nitrile rubber, fiberglass, polytetrafluoroethylene (PTFE), a plastic polymer (e.g., polychlorotrifluoroethylene, etc.), combinations thereof, and the like) are optionally adapted for use in the devices disclosed herein. Sealing material 128 substantially seals drying agent compartment 104 and sample collection support compartment 112 when the first and second body structure portions are operably connected to one another in the closed position. In some embodiments, sealing materials are separate components from the first and second body structure portions (i.e., selectively disposable between the first and second body structure portions). In certain embodiments, at least portions of sealing materials are fabricated integral with first body structure portion 102 and/or second body structure portion 108. In some embodiments, first body structure portion 102 includes protrusion 130 and second body structure portion 108 includes groove 132 that is configured to receive at least a portion of sealing material 128. Protrusion 130 is configured to compress sealing material 128 at least in groove 132 at least when the first and second body structure portions are operably connected to one another in the closed position with sealing material 128 disposed between the sections of the first and second body structure portions.

In addition, sample collection device 100 also includes closure mechanism 134 (shown as a rotatable clamping structure) operably connected, or connectable, to the first and second body structure portions at least when the first and second body structure portions are operably connected to one another in the closed position. Closure mechanism 134 is configured to maintain the first and second body structure portions in the closed position at least when the first and second body structure portions are operably connected to one another in the closed position with sealing material 128 disposed between the sections of the first and second body structure portions. In the embodiment shown, closure mechanism 134 includes latch element 136 rotatably attached to second body structure portion 108 and first body structure portion 102 includes ridge element 138 that engages latch element 136 at least when the first and second body structure portions are operably connected to one another in the closed position and when latch element 136 and ridge element 138 are in a closed position relative to one another.

In another exemplary embodiment, FIGS. 2A-2D schematically depict sample collection device 200 that includes first body structure portion 202 that includes drying agent compartment 204 configured to receive drying agent 206. Sample collection device 200 also includes second body structure portion 208 operably connected, or connectable, to first body structure portion 202. As shown, drying agent compartment 204 includes movable closure 216 (shown as a slidable door) that is movable between at least open and closed positions. Second body structure portion 208 includes a sample collection support compartment comprising one or more segments that communicate with drying agent compartment 204 at least when the first and second body structure portions are operably connected to one another in a closed position. The sample collection support compartment is configured to receive sample collection support 210. Sample collection device 200 also includes sealing material 212 (shown as a gasket) disposed, or disposable, between at least sections of the first and second body structure portions at least when the first and second body structure portions are operably connected to one another in the closed position. Sealing material 212 substantially seals at least the drying agent compartment and the sample collection support compartment when the first and second body structure portions are operably connected to one another in the closed position. In addition, sample collection device 200 also includes at least one closure mechanism 214 operably connected to the first and second body structure portions at least when the first and second body structure portions are operably connected to one another in the closed position. Closure mechanism 214 is configured to maintain the first and second body structure portions in the closed position at least when the first and second body structure portions are operably connected to one another in the closed position with the sealing material disposed between the sections of the first and second body structure portions.

In other aspects, the present disclosure provides various kits that include the sample collection devices described herein. Typically, these kits also include other components, such as drying agents (e.g., packets of molecular sieve desiccants or the like), sample collection supports (e.g., Whatman 903 dried blood spot (DBS) collection cards or the like), and instructions for using the sample collection devices to collect, store, and transport samples between sample collection sites and sample analysis sites.

Figure 3:
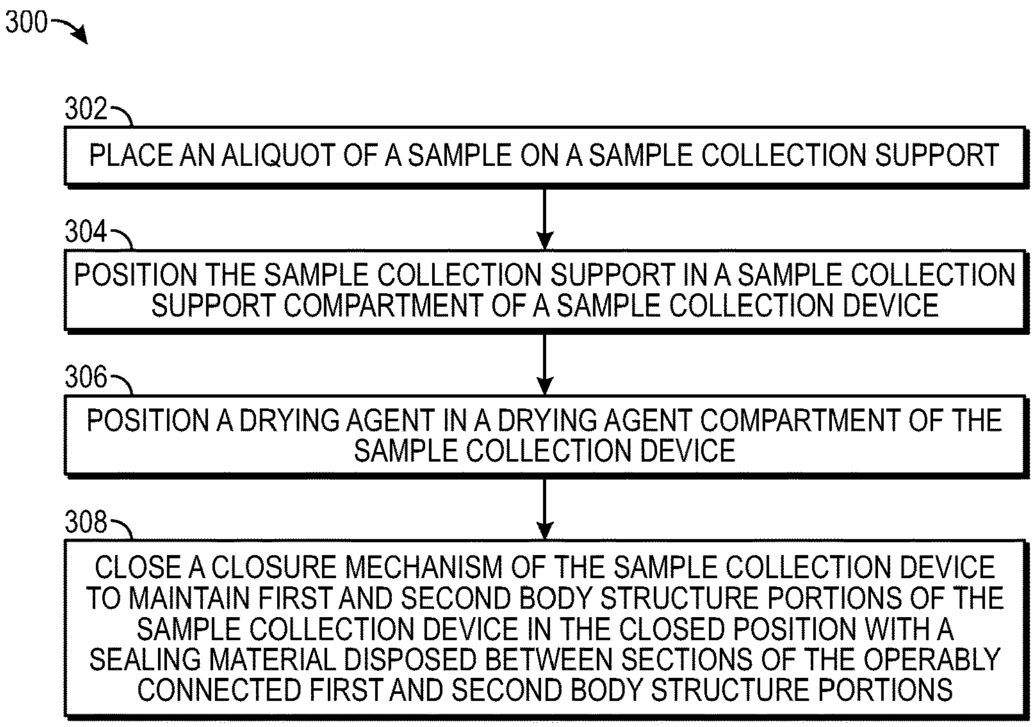
FIG. 3 is a flow chart that schematically depicts exemplary method steps according to some aspects disclosed herein.

In other exemplary aspects, the present disclosure also provides various methods. To illustrate, FIG. 3 is a flow chart that schematically depicts exemplary method steps according to some aspects disclosed herein. As shown, method 300 includes placing at least an aliquot of a sample (e.g., blood obtained from a subject) on a sample collection support (e.g., a Whatman 903 dried blood spot (DBS) collection card) (step 302) and positioning the sample collection support in a sample collection support compartment of a sample collection device as described herein (step 304). Method 300 also includes positioning the drying agent in the drying agent compartment of the sample collection device (e.g., a packet of a molecular sieve desiccant) (step 306). Some embodiments, include positioning the drying agent in the drying agent compartment before positioning the sample collection support in the sample collection support compartment of the sample collection device. In addition, method 300 also includes closing the closure mechanism of the sample collection device to maintain the first and second body structure portions of the sample collection device in the closed position with the sealing material disposed between the sections of the operably connected first and second body structure portions such that the drying agent effects the drying of the samples stored in the device on the sample collection support (step 308). Typically, method 300 also includes storing the sample in the sample collection device for a selected period of time and then analyzing the sample after opening the sample collection device.

Figure 4:
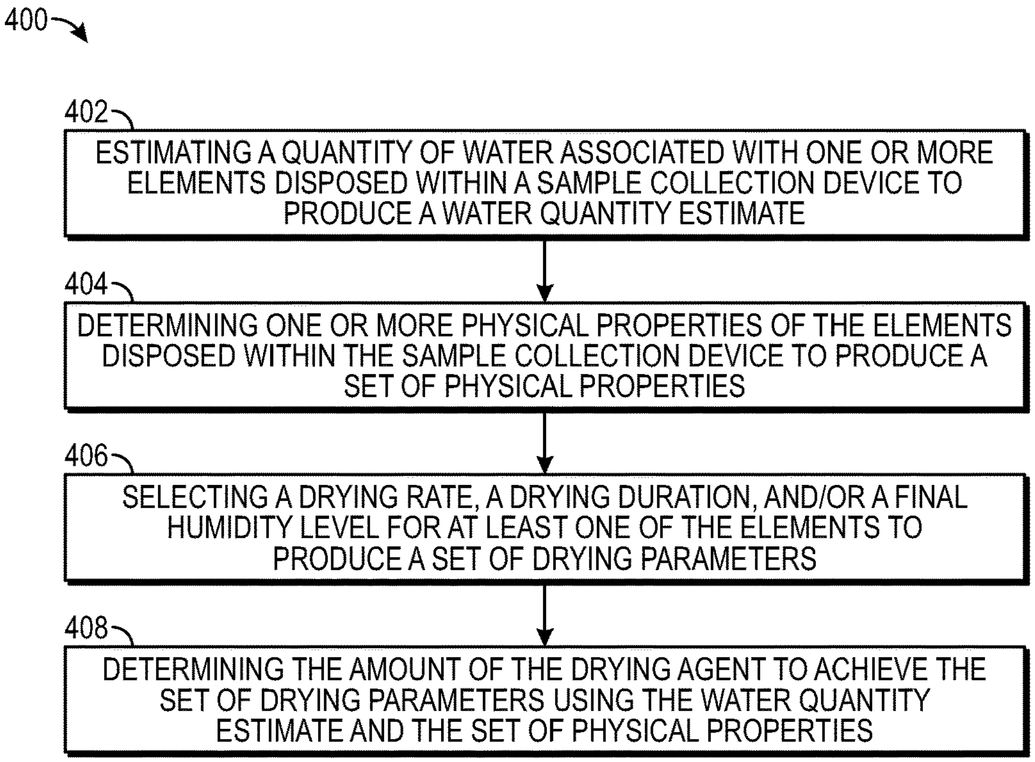
FIG. 4 is a flow chart that schematically depicts exemplary method steps according to some aspects disclosed herein.

To further illustrate, FIG. 4 is a flow chart that schematically depicts exemplary method steps of selecting an amount of a drying agent for a drying application (e.g., as part of DBS collection, drying, and storage process) according to some aspects disclosed herein. As shown, method 400 includes estimating a quantity of water associated with one or more elements disposed within a sample collection device to produce a water quantity estimate (step 402) and determining one or more physical properties of the elements disposed within the sample collection device to produce a set of physical properties (step 404). Method 400 also includes selecting a drying rate, a drying duration, and/or a final humidity level for at least one of the elements to produce a set of drying parameters (step 406) and determining the amount of the drying agent to achieve the set of drying parameters using the water quantity estimate and the set of physical properties (step 408). Typically, one or more of the steps of method 400 are performed using a computer. Computer systems and related computer readable media are described further herein. In some embodiments, method 400 includes placing at least an aliquot of the sample on a sample collection support; positioning the sample collection support in a sample collection support compartment of the sample collection device; positioning the selected amount of the drying agent in a drying agent compartment of the sample collection device; drying the sample in the sample collection device; storing the sample in the sample collection device; and/or analyzing the sample.

In certain embodiments of method 400, the quantity of water associated with the elements comprises a number of moles of water associated with the elements. In certain embodiments, method 400 includes estimating the quantity of water associated with at least one of the elements using the equation:

$$PV=nRT,$$

where P is pressure within the sample collection device, Vis volume within the sample collection device, n is number of moles of water, R is the ideal gas constant (i.e., 8.31446261815324 $J\cdot K^{-1}\cdot mol^{-1}$ expressed in SI units), and T is temperature within the sample collection device. In some embodiments of method 400, the physical properties are selected from the group consisting of: a given element, a drying agent type, a sample type, a sample collection device material, a kinetic measure of water transfer from a given element to the drying agent, a temperature of a given element, a temperature within the sample collection device, a volume within the sample collection device, a humidity level within the sample collection device, a sealing material type, a pressure level within the sample collection device, a sample collection support material, a gas type within the sample collection device, a liquid type within the sample collection device, a solid type within the sample collection device, and a phase type mixture within the sample collection device. In some embodiments of method 400, the drying agent is selected from the group consisting of: silica, activated charcoal, calcium sulfate, calcium chloride, molecular sieves, alcohols, and acetones. In some embodiments, drying agent includes one or more reagents, such as a boronic acid reagent (Miyaura et al., "Palladium-Catalyzed Cross-Coupling Reactions of Organoboron Compounds," Chemical Reviews, 95 (7): 2457-2483 (1995)), a grignard reagent (Goebel et al., "The Oxidation of Grignard Reagents," *Journal of the American Chemical Society,* 55 (4): 1693-1696 (1933)), an organozinc reagent (Knochel et al., *Organic Reactions* (2004)), an organosilicon reagent (Frampton et al., "Organosilicon Biotechnology," *Silicon,* 1:147-163 (2009)), an organotin reagent (Caseri, "Initial Organotin Chemistry," *Journal of Organometallic Chemistry,* 751:20-24 (2014)), and derivatives thereof. The amount of drying agent used in a given application is typically an amount that is sufficient to effect substantial enzymatic inhibition and/or oxidation inhibition within the sample collection device, for example, at a selected drying rate, a selected drying duration, and/or a selected final humidity level within the sample collection device in a closed position. In some embodiments of method 400, the elements are selected from the group consisting of: a sample, a non-sample material, a liquid, and a gas. In certain of these embodiments, for example, the sample comprises blood obtained from a subject. In some of these embodiments, the non-sample material comprises a sample collection support (e.g., a sample collection card, such as a DBS card).

Sample collection device components (e.g., first and second body structure portions, closure mechanisms, etc.) are optionally formed by various fabrication techniques or combinations of such techniques including, e.g., extrusion, injection molding, cast molding, stamping, machining, embossing, engraving, etching (e.g., electrochemical etching, etc.), 3D printing, or other techniques. These and other suitable fabrication techniques are generally known in the art and described in, e.g., Molinari et al. (Eds.), Metal Cutting and High Speed Machining, Kluwer Academic Publishers (2002), Chung, Extrusion of Polymers: Theory and Practice, Hanser-Gardner Publications (2000), Altintas, Manufacturing Automation: Metal Cutting Mechanics, Machine Tool Vibrations, and CNC Design, Cambridge University Press (2000), Stephenson et al., Metal Cutting Theory and Practice, Marcel Dekker (1997), Fundamentals of Injection Molding, W. J. T. Associates (2000), Whelan, Injection Molding of Thermoplastics Materials, Vol. 2, Chapman & Hall (1991), Rosato, Injection Molding Handbook, 3rd Ed., Kluwer Academic Publishers (2000), Fisher, Extrusion of Plastics, Halsted Press (1976), and Redwood et al., The 3D Printing Handbook: Technologies, 1st Ed., Design and Applications, 3D Hubs (2017), which are each incorporated by reference. Exemplary materials optionally used to fabricate device components include, e.g., metal (e.g., magnetic and/or non-magnetic), glass, wood, polymethylmethacrylate, polyethylene, polydimethylsiloxane, polyetheretherketone, polytetrafluoroethylene, polystyrene, polyvinylchloride, polypropylene, polysulfone, polymethylpentene, and polycarbonate, among many others. In some embodiments, following fabrication, device components are optionally further processed, e.g., by painting, coating surfaces with a hydrophilic coating or a hydrophobic coating, or the like.

Figure 5:
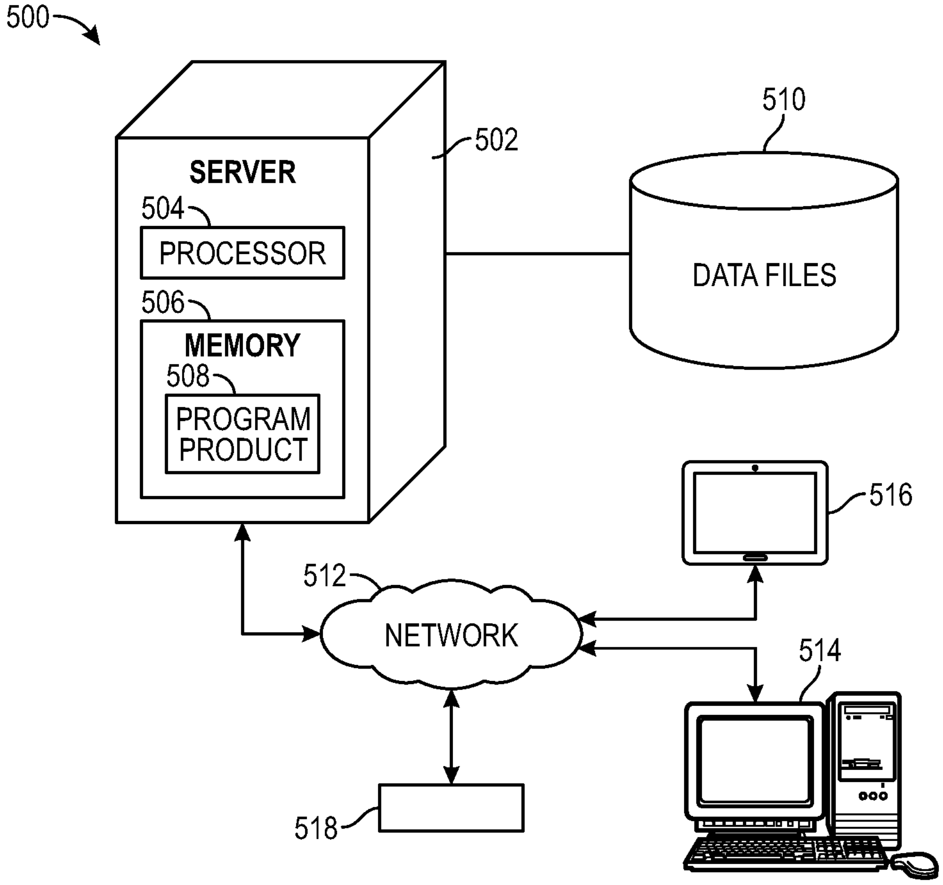
FIG. 5 is a schematic diagram of an exemplary system suitable for use with certain embodiments.
Figure 6A:
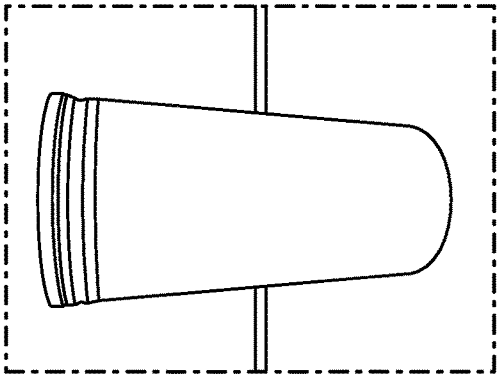
FIG. 6 (panels A-H) are images for kit contents and experimental methods suitable for use with certain embodiments.
Figure 6B:
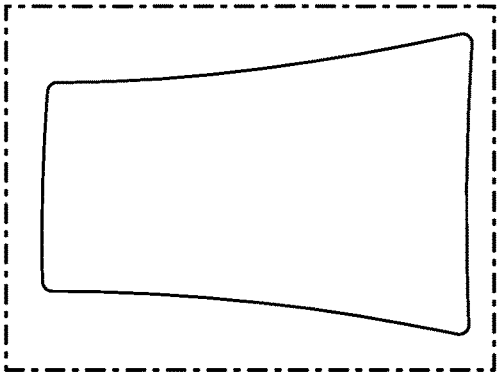
Figure 6C:
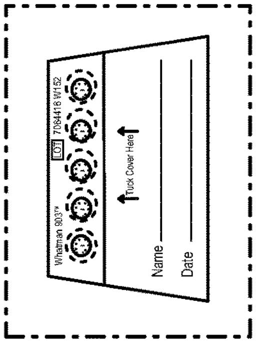
Figure 6D:
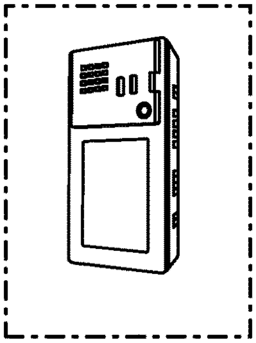
Figure 6E:
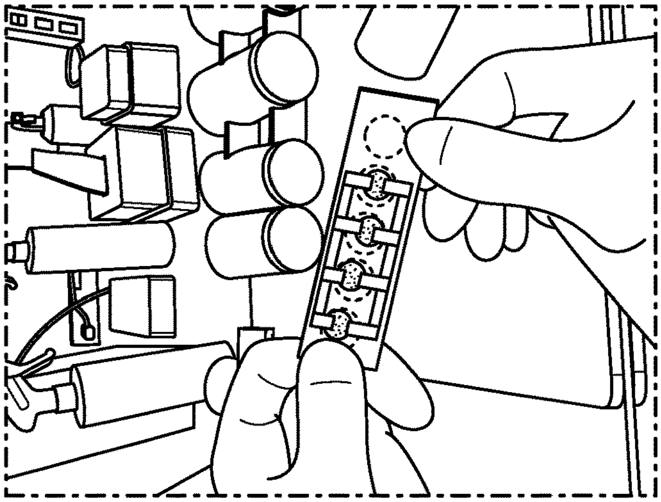
Figure 6F:
Figure 6G:
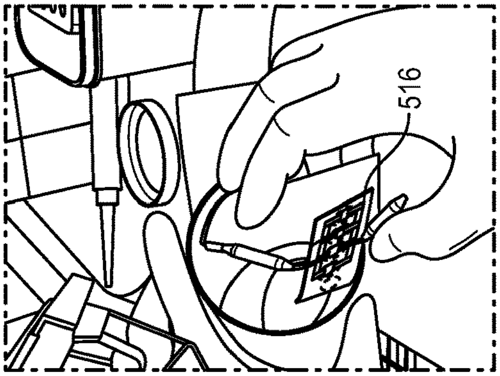
Figure 6H:
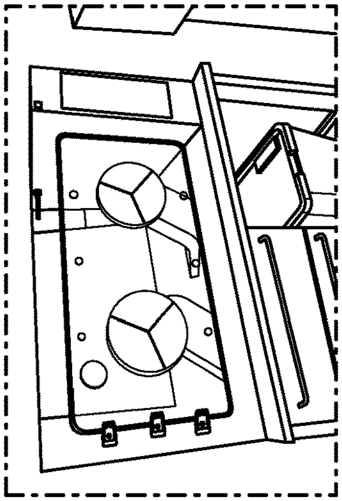

The present disclosure also provides various systems and computer program products or machine readable media. In some aspects, for example, the methods described herein are optionally performed or facilitated at least in part using systems, distributed computing hardware and applications (e.g., cloud computing services), electronic communication networks, communication interfaces, computer program products, machine readable media, electronic storage media, software (e.g., machine-executable code or logic instructions) and/or the like. To illustrate, FIG. 5 provides a schematic diagram of an exemplary system suitable for use with implementing at least aspects of the methods disclosed in this application. As shown, system 500 includes at least one controller or computer, e.g., server 502 (e.g., a search engine server), which includes processor 504 and memory, storage device, or memory component 506, and one or more other communication devices 514, 516, (e.g., client-side computer terminals, telephones, tablets, laptops, other mobile devices, etc. positioned remote from sample collection device (e.g., an RFID tag, a dryness sensor, a barcode, and/or the like associated with the device) 518 and in communication with the remote server 502, through electronic communication network 512, such as the Internet or other internetwork. Communication devices 514, 516 typically include an electronic display (e.g., an internet enabled computer or the like) in communication with, e.g., server 502 computer over network 512 in which the electronic display comprises a user interface (e.g., a graphical user interface (GUI), a web-based user interface, and/or the like) for displaying results upon implementing the methods described herein. In certain aspects, communication networks also encompass the physical transfer of data from one location to another, for example, using a hard drive, thumb drive, or other data storage mechanism. System 500 also includes program product 508 stored on a computer or machine readable medium, such as, for example, one or more of various types of memory, such as memory 506 of server 502, that is readable by the server 502, to facilitate, for example, a guided search application or other executable by one or more other communication devices, such as 514 (schematically shown as a desktop or personal computer). In some aspects, system 500 optionally also includes at least one database server, such as, for example, server 510 associated with an online website having data stored thereon searchable either directly or through search engine server 502. System 500 optionally also includes one or more other servers positioned remotely from server 502, each of which are optionally associated with one or more database servers 510 located remotely or located local to each of the other servers. The other servers can beneficially provide service to geographically remote users and enhance geographically distributed operations.

As understood by those of ordinary skill in the art, memory 506 of the server 602 optionally includes volatile and/or nonvolatile memory including, for example, RAM, ROM, and magnetic or optical disks, among others. It is also understood by those of ordinary skill in the art that although illustrated as a single server, the illustrated configuration of server 502 is given only by way of example and that other types of servers or computers configured according to various other methodologies or architectures can also be used. Server 502 shown schematically in FIG. 5, represents a server or server cluster or server farm and is not limited to any individual physical server. The server site may be deployed as a server farm or server cluster managed by a server hosting provider. The number of servers and their architecture and configuration may be increased based on usage, demand and capacity requirements for the system 500. As also understood by those of ordinary skill in the art, other user communication devices 514, 516 in these aspects, for example, can be a laptop, desktop, tablet, personal digital assistant (PDA), cell phone, server, or other types of computers. As known and understood by those of ordinary skill in the art, network 512 can include an internet, intranet, a telecommunication network, an extranet, or world wide web of a plurality of computers/servers in communication with one or more other computers through a communication network, and/or portions of a local or other area network.

As further understood by those of ordinary skill in the art, exemplary program product or machine readable medium 508 is optionally in the form of microcode, programs, cloud computing format, routines, and/or symbolic languages that provide one or more sets of ordered operations that control the functioning of the hardware and direct its operation. Program product 508, according to an exemplary aspect, also need not reside in its entirety in volatile memory, but can be selectively loaded, as necessary, according to various methodologies as known and understood by those of ordinary skill in the art.

As further understood by those of ordinary skill in the art, the term "computer-readable medium" or "machine-readable medium" refers to any medium that participates in providing instructions to a processor for execution. To illustrate, the term "computer-readable medium" or "machine-readable medium" encompasses distribution media, cloud computing formats, intermediate storage media, execution memory of a computer, and any other medium or device capable of storing program product 508 implementing the functionality or processes of various aspects of the present disclosure, for example, for reading by a computer. A "computer-readable medium" or "machine-readable medium" may take many forms, including but not limited to, non-volatile media, volatile media, and transmission media. Non-volatile media includes, for example, optical or magnetic disks. Volatile media includes dynamic memory, such as the main memory of a given system. Transmission media includes coaxial cables, copper wire and fiber optics, including the wires that comprise a bus. Transmission media can also take the form of acoustic or light waves, such as those generated during radio wave and infrared data communications, among others. Exemplary forms of computer-readable media include a floppy disk, a flexible disk, hard disk, magnetic tape, a flash drive, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Program product 508 is optionally copied from the computer-readable medium to a hard disk or a similar intermediate storage medium. When program product 508, or portions thereof, are to be run, it is optionally loaded from their distribution medium, their intermediate storage medium, or the like into the execution memory of one or more computers, configuring the computer(s) to act in accordance with the functionality or method of various aspects. All such operations are well known to those of ordinary skill in the art of, for example, computer systems.

To further illustrate, in certain aspects, this application provides systems that include one or more processors, and one or more memory components in communication with the processor. The memory component typically includes one or more instructions that, when executed, cause the processor to provide information that causes at least one data reports and/or the like to be displayed (e.g., via communication devices 514, 516 or the like) and/or receive information from other system components and/or from a system user (e.g., via communication devices 514, 516, or the like).

In some aspects, program product 508 includes non-transitory computer-executable instructions which, when executed by electronic processor 504 perform at least: estimating a quantity of water associated with one or more elements disposed at least partially within a sample collection device to produce at least one water quantity estimate; determining one or more physical properties of the elements disposed at least partially within the sample collection device to produce at least one set of physical properties; selecting a drying rate, a drying duration, and/or a final humidity level for at least one of the elements to produce at least one set of drying parameters; and determining the amount of the drying agent to achieve the set of drying parameters using the water quantity estimate and the set of physical properties.

Additional details relating to computer systems and networks, databases, and computer program products are also provided in, for example, Peterson, *Computer Networks: A Systems Approach*, Morgan Kaufmann, 5th Ed. (2011), Kurose, *Computer Networking: A Top-Down Approach, Pearson,* $7^{th}$ Ed. (2016), Elmasri, *Fundamentals of Database Systems*, Addison Wesley, 6th Ed. (2010), Coronel, *Database Systems: Design, Implementation, & Management*, Cengage Learning, $11^{th}$ Ed. (2014), Tucker, *Programming Languages*, McGraw-Hill Science/Engineering/Math, 2nd Ed. (2006), and Rhoton, *Cloud Computing Architected: Solution Design Handbook*, Recursive Press (2011), which are each incorporated by reference in their entirety.

EXAMPLES

Example 1

Background

Dried blood spots (DBS) are a minimally invasive method for the collection of small volumes of blood (<50 microliters) from finger or heel stick and transfer to filter paper cards for drying and storage [1-2]. In principle, anything that can be measured from liquid whole blood, plasma or serum, can be measured in dried blood spots [3]. All major categories of analytic methods have been applied for measuring analytes in DBS, including electrophoresis, immunoassay, chromatography, mass spectrometry, spectroscopy, and polymerase chain reaction (PCR) [4]. To date, DBS samples have been used for measuring over 1,900 different analytes, and have been applied to a variety of uses in basic research, public health, and clinical medicine [4].

The simplicity of collection methods and small volume of blood sample enable DBS to be collected without the need for a trained phlebotomist [5-6]. Additionally, the use of a dried matrix allows for ambient shipping and storage, and removes the requirement for cold chain, which is necessary for traditional liquid samples such as whole blood, plasma, and serum [5-6]. These benefits make DBS a preferred method for the collection of biosamples in the field (i.e. outside of the traditional clinic or lab setting). However, some limitations in the methods for DBS collection continue to impede wider adoption in a range of settings. Variability inherent in rates of drying blood samples, and a minimum requirement of several hours open-air drying prior to sample storage or shipment are often cited as constraints on wider adoption of DBS [7-9]. As the quality and availability of highly sensitive analytical instrumentation, such as mass spectrometry, continue to improve, constraints around detection limits and variability in measuring analytes from DBS have become less of an impediment to adoption [10-11]. Yet the issue of open-air drying remains unresolved.

The current collection protocol recommended by the United States Centers for Disease Control and Prevention (CDC) requires a minimum open-air drying time of 3 hours prior to sample storage [12]. This requirement is problematic in many settings of sample collection, including field collection studies. Open-air drying is logistically difficult during field collection as space for drying racks may not be available, conditions are often not conducive to drying (e.g. high humidity in tropical climates), and in the case of household surveys or other technically challenging environments such as occupational or austere settings, open-air drying for several hours may not be acceptable or feasible

[6, 13-14]. Open-air drying in field settings also increase the risk of sample exposure to dust, chemical contaminants ubiquitous in the environment, airborne pathogens, and small insects to name a few [15-16]. These risks are particularly problematic when target analytes include DNA or environmental contaminants, as sample measurements of either may actually reflect sample exposures during drying rather than host exposures prior to sample collection [16]. Variable ambient conditions of humidity also affect the drying times of DBS samples, which is problematic as drying times have a direct impact on measurements for a range of target analytes, particularly metabolites, RNA, and all classes of analytes susceptible to hydrolysis, or other processes utilizing water for analyte degradation [7, 17-19]. In conditions of low or moderate humidity (i.e. relative humidity of less than 60%) drying times of 90 minutes are reported, whereas in conditions of high humidity (i.e. relative humidity equal to or greater than 60%) drying times as high as 150 minutes or more have been reported [20-21]. The ability to dry and store DBS samples shortly after blood collection, without compromising drying times, while also reducing variability of drying conditions that affect analyte stability, could enable wider adoption of DBS sampling in a range of settings, especially field settings, and may provide better quality measurements.

The objective of this study was to demonstrate a novel DBS collection kit aimed at enabling field collection and storage. It was hypothesized that the novel collection kits will enable storage of DBS samples quickly after collection without compromising drying times. Specifically, it was hypothesized that DBS samples stored in the kits immediately after collection would have average drying times of less than 90 minutes in conditions of low to moderate, or high humidity. Storage quickly after blood collection in kits protected from environmental exposures, and which improve drying times, could remove some of the major impediments to wider adoption of DBS sampling, especially in field settings.

Methods

Kit Selection and Justification

The goal of kit selection and optimization was to design and optimize a kit that maintained the simplicity of DBS methods such that they could be used effectively in field settings. Inclusion criteria for kit design and fabrication were as follows:

1. Kit materials must be commercially available.
2. Kit contents must not require any additional manufacturing or engineering beyond the point of procurement/purchasing.
3. Kit contents must be easily put together by end users in the field.

Novel DBS collection kits were designed with a closed-system (i.e. airtight containers protected from the external environment) by inclusion of an opaque, airtight, cylindrical container with an optimized amount of molecular sieve desiccant, and use of a DBS filter paper card. The container selected included a 644 mL aluminum, opaque, cylindrical bottle with screw-on cap from Elemental Container (FIG. 6 (panel A); product #0075152). The use of an opaque container was selected in order to meet current recommendations for drying DBS samples away from direct sunlight, which could be an issue during field collection as personnel may need to move blood samples shortly after collection. The use of an airtight container was selected in order to allow control and modulation of the moisture conditions within the kit. The cylindrical shape and size of the container was selected to allow enough space for inclusion of desiccant, filter paper card, and wireless sensors with data loggers for measuring drying times of blood spots, and tracking relative humidity and temperature during experimentation. Molecular sieve MiniPax absorbent Multisorb Technologies (FIG. 6 (panel B); product #02-00041AG19) were used as the desiccant of choice, as opposed to the more common silica gel desiccant, due to their ability to absorb moisture faster and maintain moisture within the desiccant under dynamic or extreme temperature conditions, which were directly tested in the study as described herein under *Stress Testing Methods*. Whatman 903 filter paper cards from GE Healthcare Life Sciences (FIG. 6 (panel C); product #10531018) were selected for inclusion in the kits due to being the most commonly used type of filter paper card in DBS studies, as well as their history of rigorous quality assurance testing from CDC [22-23]. The optimal amount of molecular sieve (i.e. 40 grams) was determined experimentally and was based on the volume of air within the selected kit container, type of filter paper card, and expected amount of moisture introduced into the closed-system by a freshly spotted filter paper card. More specifically, in preparation for the study, a series of experiments were conducted with increasing amounts of molecular sieve desiccant within the kits in order to determine the optimal amount of sieve for removing moisture from the closed-system. These methods and findings are reported herein under Supplementary Materials.

Drying Rate Methods

Goal: The goal of the drying rate experiments was to determine the time required for blood on filter paper cards to dry within the novel DBS collection kits. Drying in the experiment was defined as the time at which specially designed resistance sensors, as described below, achieved a stable measurement, which indicated all detectable moisture had evaporated from the blood spot.

Outcome Measures: The outcome measures of interest included (1) time required for freshly spotted human whole blood to dry on filter paper cards within DBS kits and (2) time required for the relative humidity (RH) inside kits to reach near zero moisture levels, defined here as an RH level of less than 0.01%. As the study sought the time required for spots to dry within a closed system, common approaches such as periodic weight measurements of filter paper cards could not be used. In consultation with the Biomedical Engineering Department at Johns Hopkins University, a novel method for measuring drying time was developed. Specifically, resistance, which is a measure of opposition to passage of electric current through a media, in this case, blood on filter paper was utilized [24]. As spots dry on filter paper cards and conductivity of the current reduces, resistance measurements will eventually begin to drop and stabilize once the spot is dry. Note, the use of resistance for measuring drying weights (data not shown) outside of the closed-system kits was cross-validated by real time monitoring of resistance measurements at 1-minute intervals followed by weight measurements of filter paper cards with a microscale before and after resistance levels stabilized.

Figure 7:
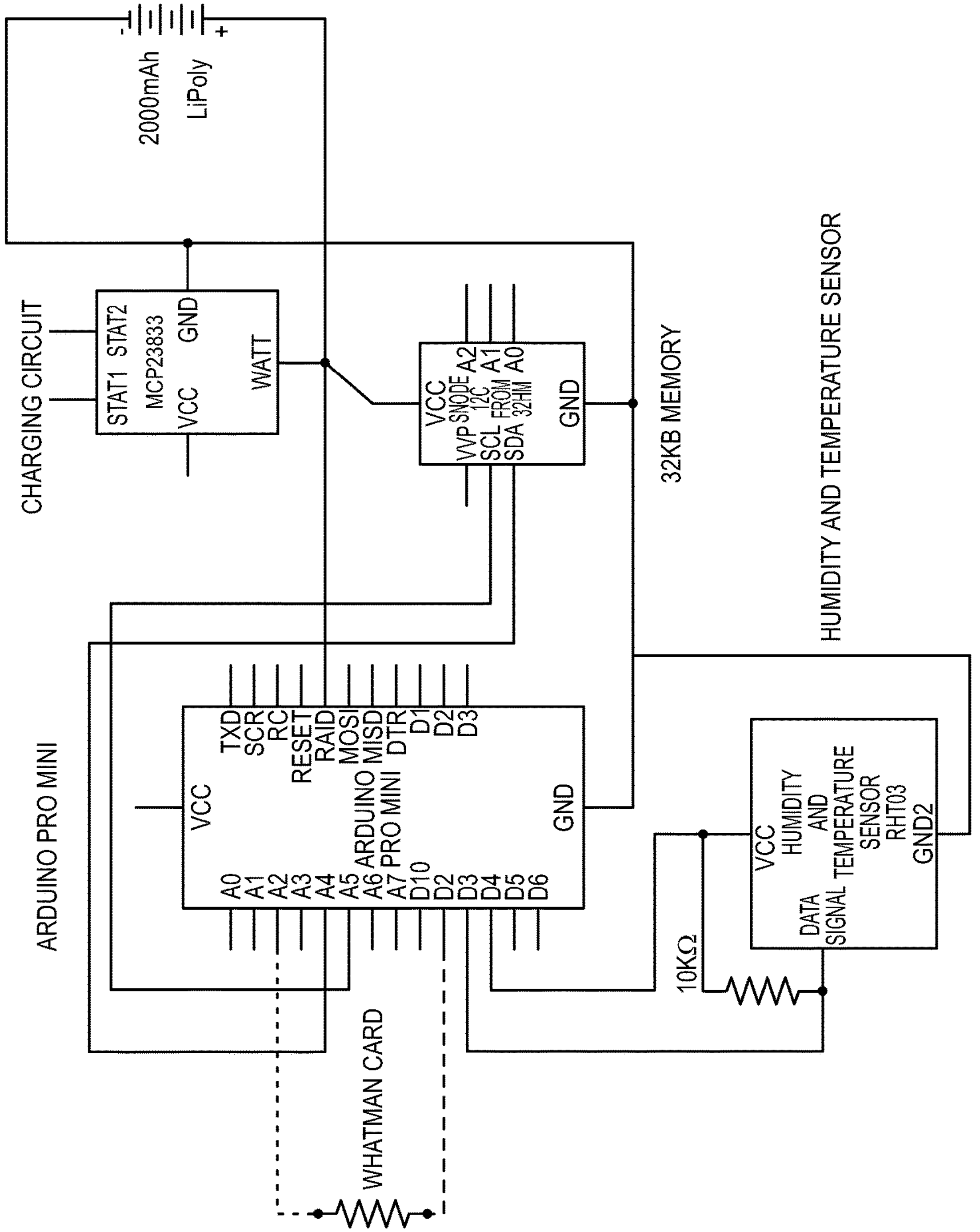
FIG. 7 is a schematic circuit diagram of a resistance sensor for measuring drying rate of blood spots according to certain embodiments.

Materials: Kit containers were procured directly from Elemental Container; 10 g molecular sieve desiccant packets and Whatman 903 cards were procured from Sigma-Aldrich; wireless bluetooth enabled RH/temperature HOBO data loggers (FIG. 6 (panel D); product #MX1101) were procured from ONSET; and 200 microliter adjustable pipettes (product #3121000082) were procured from Eppendorf. For measuring drying rate of blood spots, a resistance measuring and storage system was designed and built from scratch by assembling components procured from the online digital electronics retailers Adafruit and Sparkfun. Specifically, drying was assessed through resistance across blood spots as measured by applying a constant DC voltage of 3.7V with the help of a lithium polymer battery (product #2011). The data obtained from this system was stored in a data logger (product #1895). The data collection, storage, and retrieval was managed using an Arduino pro mini microcontroller (product #2377). Additionally, a circuit scribe conductive ink pen (product #COM-13254) was procured from Sparkfun, and mini alligator clips (product #CZACA) were procured from Amazon. After procurement, all components were soldered together and the sensor designed as show in the circuit diagram (FIG. 7). An Arduino program was then designed and written for logging resistance data from sensors during experimentation. 30 mL of fresh donor human whole blood (i.e. collected less than 48 hours from time of experimental use) with sodium citrate anticoagulant was procured from Innovative Research (product #IPLA-WB1).

Process: Drying rate experiments were conducted under ambient lab conditions, which included a temperature range of 22-24° C. and moderate humidity (30-50% RH), and under simulated field conditions of 24-25° C. and high humidity conditions (>50% RH) in the rainforest exhibit of the National Aquarium in Baltimore, Maryland. All experiments utilized the same study design, which included 6 replicate kits with optimized amounts of molecular sieve desiccant and filter paper cards freshly spotted with human whole blood. Specifically, circuit pens (product #COM-13254) were used to draw an electric circuit onto filter paper cards (FIG. 6 (panel E)) and attached mini alligator clips, which were connected to the microcontroller circuit. HOBO and resistance sensor data logging was then started at 1-minute measurement intervals, spot a total of four 30 uL spots of human whole blood via micropipette onto Whatman 903 filter paper cards, and immediately placed the spotted cards, HOBO sensors, resistance sensors, and optimized amount of molecular sieve desiccant into the containers and sealed them (FIG. 6 (panel F)). Experiments were carried out for 24 hours, after which time containers were unsealed, HOBO and resistance sensors were stopped, and data was downloaded in Excel and CSV formats to a desktop computer. Data was then imported into Stata version 13.1 for analysis.

Analysis: Resistance measurements and recorded drying time were inspected by measure of the Time to Stability (TTS), defined here as the minutes required for resistance measurements to decrease and stabilize. The mean and standard deviation for drying times of all 6 replicates in each experiment was calculated. The mean and standard deviation for time required to reach near zero moisture levels was also calculated. Two-sample t-tests were conducted to determine if the differences in drying times between the three experiments was significant.

Extended Storage Methods

Goal: The goal of the extended storage experiment was to determine if near zero moisture levels inside DBS kits was maintained for at least 14 days of storage.

Outcome Measure: The outcome measure for the extended storage experiment was RH.

Materials: Containers, desiccant, DBS cards, RH/temperature data loggers, pipettes, and human whole blood were procured as previously specified.

Process: 6 replicate kits with optimized amounts of molecular sieve desiccant and filter paper cards were freshly spotted with human whole blood and included in the extended storage experiment. Specifically, HOBO sensor data logging was started at 1-minute measurement intervals, then spotted four 30 uL spots of human whole blood via micropipette onto Whatman 903 filter paper cards, and immediately placed the spotted cards, HOBO sensors, and optimized amount of molecular sieve desiccant into the containers and sealed them. The experiment was carried out for 14 days, after which time containers were unsealed, HOBO sensors were stopped, and data was downloaded in Excel and CSV formats to a desktop computer. Data was then imported into Stata version 13.1 for analysis.

Analysis: RH values were inspected to determine time required for near zero moisture levels to be achieved, and determined if RH levels rose above near zero moisture levels at any time thereafter.

Stress Test Methods

Goal: The goal of the stress test experiment was to determine if near zero moisture levels were maintained by molecular sieve desiccants under temperature extremes (i.e. does moisture escape from the sieve under extreme heat or cold).

Outcome Measure: The outcome measure for the extended storage experiment was RH.

Materials: Containers, desiccant, DBS cards, RH/temperature data loggers, pipettes, and human whole blood were procured as previously specified. An environmental chamber was procured on loan from the Johns Hopkins University Applied Physics Laboratory (FIG. 6 (panel H)), and a minus twenty freezer was already present in the lab for experimentation.

Process: 6 replicate kits with optimized amounts of molecular sieve desiccant and filter paper cards were freshly spotted with human whole blood and included in the stress testing experiment. Specifically, HOBO sensor data logging was started at 1-minute measurement intervals, then spotted 4-30 uL spots of human whole blood via micropipette onto Whatman 903 filter paper cards, and immediately placed the spotted cards, HOBO sensors, and optimized amount of molecular sieve desiccant into the containers and sealed them. Moisture levels inside the kits were allowed to reach near zero levels before beginning stress testing. After near zero moisture levels were achieved, kits were placed inside of an environmental chamber and heated to >38° C. Kits were then removed from the environmental chamber and allowed to return to ambient conditions. After returning to ambient conditions, kits were placed inside a freezer and cooled to below 0° C., after which time containers were removed from the freezer and allowed to return to ambient temperatures. After returning to ambient temperatures, kits were unsealed, HOBO sensors stopped, and data downloaded in Excel and CSV formats to a desktop computer. Data was then imported into Stata version 13.1 for analysis.

Analysis: RH values were inspected to determine if RH levels rose above near zero moisture levels at any time during the stress test.

Results

Drying Rate

Figure 8:
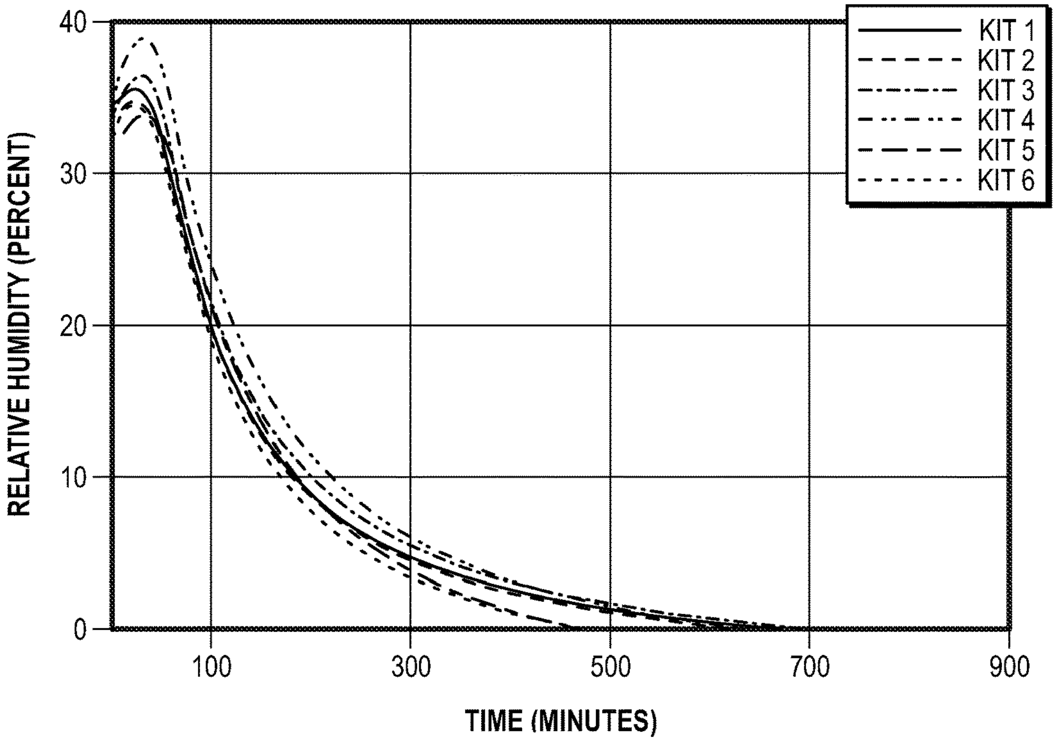
FIG. 8 is a plot showing moisture conditions for DBS kits during a lab-based drying experiment.
Figure 9:
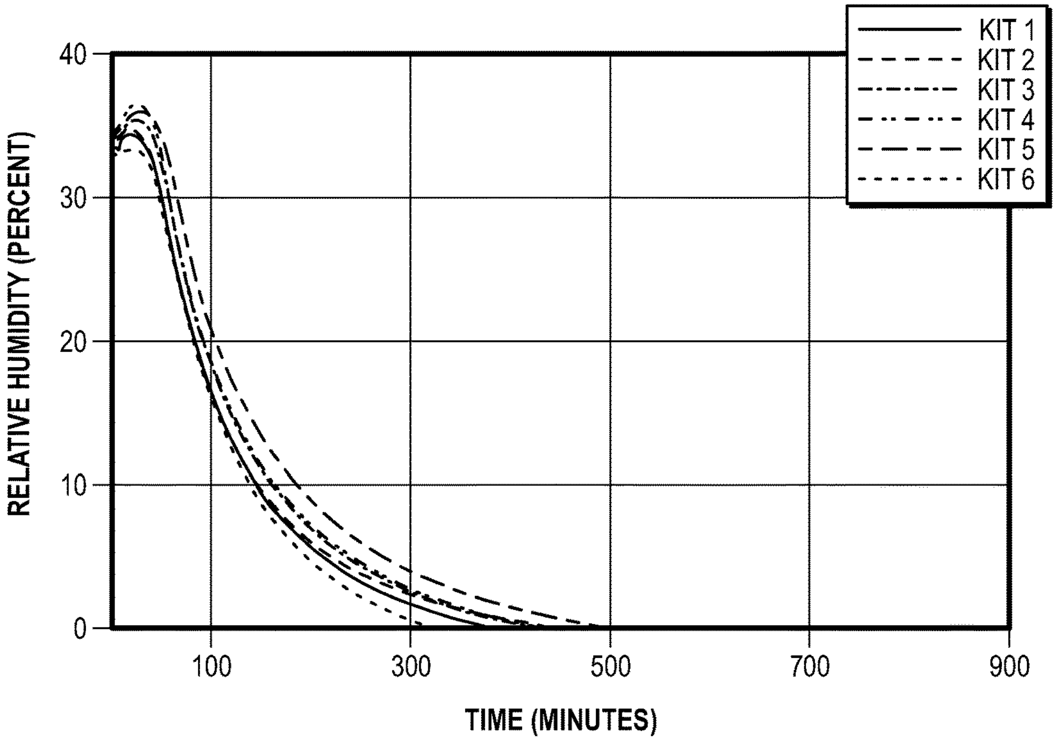
FIG. 9 is a plot showing internal moisture conditions for DBS kits during a lab-based drying experiment.

Lab-based drying rate experiments were conducted under ambient lab conditions. Experimental data is reported in Table 1-1. Temperatures in the lab during drying for lab-based experiment 1 ranged between 22 and 24° C. with an ambient RH between 33 and 35%. Mean resistance-based blood spot drying time for lab-based experiment 1 was calculated at 47.6 minutes (n=5, SD=4.51) (Note, lab-based experiment 1 and field simulation have an n of 5 for mean drying time due to resistance sensor failures during experimentation. RH sensors operating during these same experiments functioned for all 6 replicates, and therefore time required to achieve near zero moisture has an n of 6 for all three experiments.). The mean time required to achieve near zero moisture conditions inside kit containers for lab-based experiment 1 was calculated at 603.8 minutes (n=6, SD=100.9), or approximately 10 hours. Ambient conditions for lab-based experiment 2 were similar to experiment 1, as were the recorded blood spot drying times. Specifically, temperatures in the lab during drying for lab-based experiment 2 ranged between 22 and 23° C. with an ambient RH between 33 and 35%. Mean resistance-based blood spot drying time for lab-based experiment 2 was calculated at 53.3 minutes (n=6, SD=6.95). The mean time required to achieve near zero moisture conditions inside kit containers for lab-based experiment 2 was calculated at 423.2 minutes (n=6, SD=61.1), or approximately 7 hours. A two sample t test was calculated for comparing experiments 1 and 2. No significant difference in blood spot drying times was detected between experiments 1 and 2 (df=9, t=1.58, p=0.1482). Visual inspection of RH curves for experiments 1 and 2 had similar findings (FIGS. 8 and 9). Specifically, an initial increase above starting RH levels of 5-10% was detected for all 6 replicates, followed by rapid RH depletion until RH fell below 20%, after which time RH depletion slows until near zero moisture is achieved.

TABLE 1-1

Drying time and time required to achieve near zero moisture for drying rate experiments.

| Experimental Setting | External Ambient Conditions During Drying | Resistance-Based Drying Time (Mean + SD) | Time Required to Achieve Near Zero Moisture in Kits (Mean + SD) |
|---|---|---|---|
| Lab-Based 1 | RH range = 33-35% T = 22-24° C. | 47.6 + 4.5 min (n = 5) | 604 + 101 min or ~10 hours (n = 6) |
| Lab-Based 2 | RH = 33-35% T = 22-23° C. | 53.3 + 7.0 min (n = 6) | 423 + 61 min or ~7 hours (n = 6) |
| Field Simulation (Rainforest) | RH = 49-65% T = 24-25° C. | 72.4 + 13.4 min (n = 5) | 559 + 140 min or ~9 hours (n = 6) |

Figure 10:
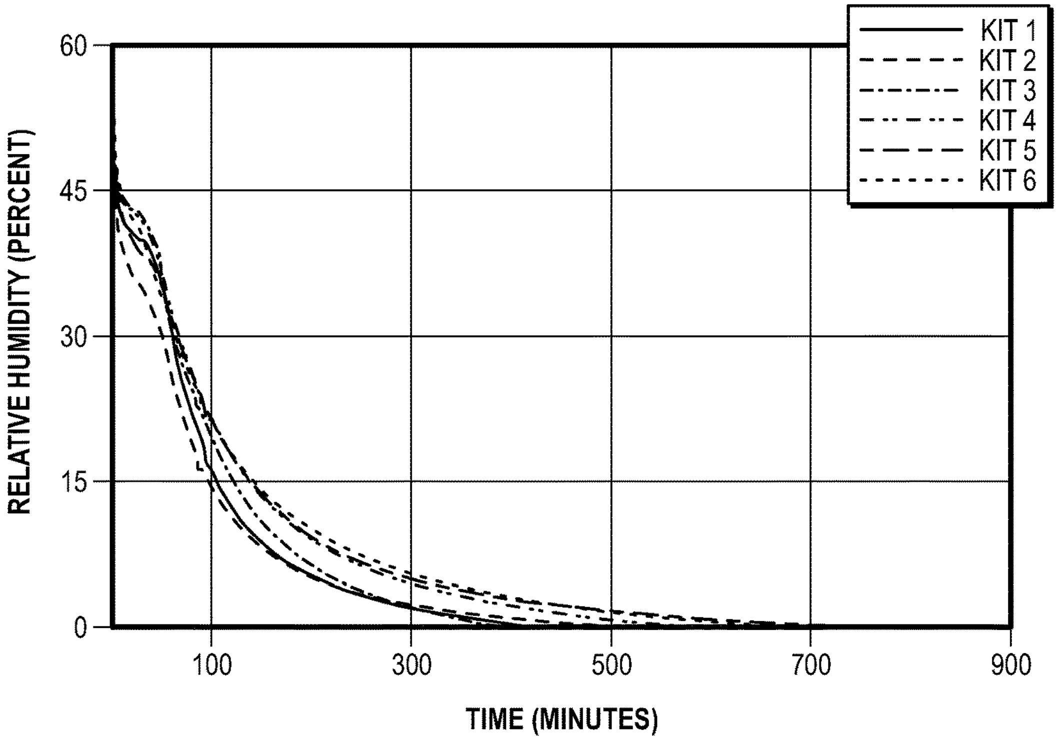
FIG. 10 is a plot showing internal moisture conditions for DBS kits during field simulation a drying rate experiment in the Rainforest Exhibit of the National Aquarium (Baltimore, Maryland, USA).

In order to simulate high humidity field conditions, a field simulation experiment was conducted in the rain forest exhibit of the National Aquarium in Baltimore, Maryland. Data for the field simulation is reported in Table 1-1. Temperatures in the rain forest exhibit during drying ranged between 24 and 25° C. with an ambient RH between 49 and 61%. Mean resistance-based drying time for the field simulation was calculated at 72.4 minutes (n=5, SD=13.39). The mean time required to achieve near zero moisture conditions inside kit containers for the field simulation was calculated at 558.5 minutes (n=6, SD=139.8), or approximately 9 hours. Two sample t-tests were calculated for comparing blood spot drying times in the field simulation with the lab-based experiments. A significant difference in drying times was detected for the field simulation versus lab-based experiment 1 (df=8, t=3.93, p=0.0044). A significant difference in drying times was also detected for the field simulation versus lab-based experiment 2 (df=9, t=3.05, p=0.0138). Visual inspection of the RH curves for the field simulation found a different shape than what was found for the lab-based experiments (FIG. 10). Specifically, there is an immediate drop of 5-10% in detected RH levels inside kit containers for all 6 replicates followed by a leveling off of RH, and then a rapid decline until RH falls below 20%, after which time RH depletion slows until near zero moisture is achieved.

Extended Storage and Stress Test

Figure 11:
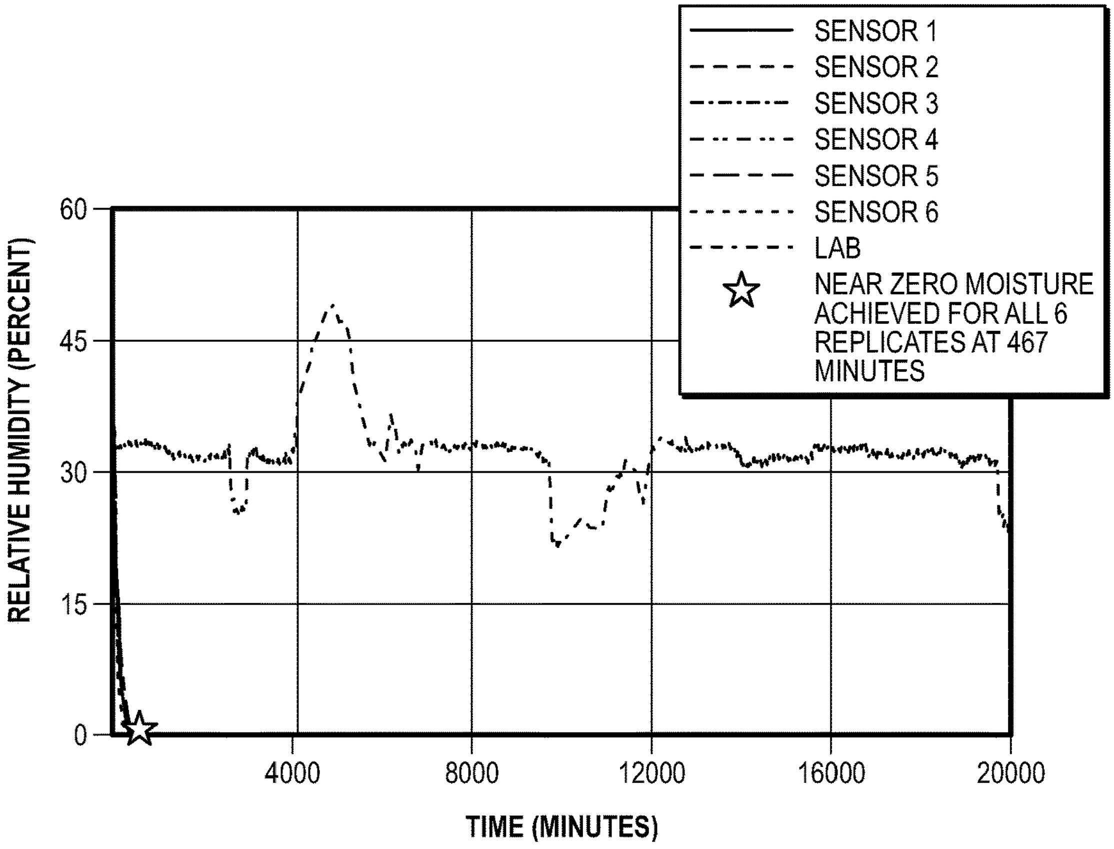
FIG. 11 is a plot showing internal moisture conditions for DBS kits during a 14 day extended storage experiment.
Figure 12:
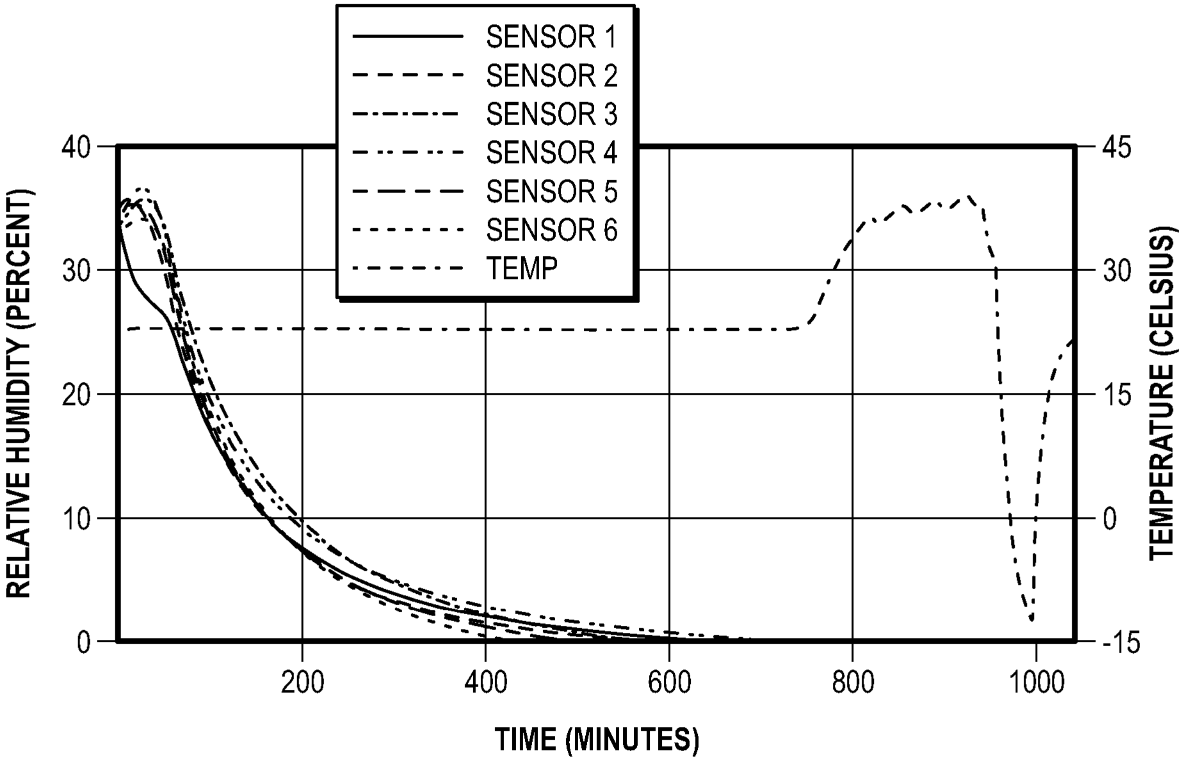
FIG. 12 is a plot showing internal moisture conditions for DBS kits during a stress test experiment.

Extended storage and stress test experimental findings were unremarkable. After achieving near zero moisture conditions within containers, all 6 replicates maintained near zero moisture throughout the 14-day storage period (FIG. 11). Under stress testing, near zero moisture conditions were maintained for all 6 replicates under conditions of extreme heat and cold. Specifically, neither heating kits to >38° C. nor cooling kits to below freezing (i.e. <0° C.) resulted in any detectable moisture being released by the molecular sieve desiccant during experimentation (FIG. 12).

Discussion

Consistent with the study's hypothesis, findings suggest that the novel DBS collection and storage kits can remove the requirement of open-air drying, while reliably drying DBS samples in less than 90 minutes in low to moderate or high humidity conditions. Though low humidity conditions were not directly tested in this experiment, both moderate and high humidity conditions demonstrated mean drying times of less than 90 minutes, and would suggest that low humidity conditions would perform similarly well, if not better. Both experiments conducted under ambient conditions of moderate humidity demonstrated mean drying times of less than 60 minutes, which compares favorably with previous studies citing 90-minute drying times for similar ambient conditions [20-21]. These findings represent approximately a 30% improvement in blood spot drying compared with open-air drying. Kit performance under ambient conditions of high humidity compared with open-air drying under similar conditions was even more pronounced. Mean drying times for DBS samples in kits during field simulation in the high humidity environment of the rainforest exhibit at the National Aquarium in Baltimore were less than 75 minutes, which represents approximately a 50% improvement in blood spot drying compared with previous studies citing as high as 150 minutes or more under high humidity [20-21].

In contrast to ambient conditions of moderate humidity, which demonstrate an immediate increase in the internal RH conditions of kits, ambient conditions of high humidity demonstrated an immediate decrease in the internal RH conditions of kits. In the case of an immediate increase in internal RH conditions inside kits compared with the external environment, it could be inferred that drying conditions for DBS samples inside our kits used in moderate or low humidity conditions are initially worse than open-air drying in similar conditions. However, drying times suggest this is not the case. The initial increase in RH detected within kits may simply be a result of moisture being transferred quickly through the air as it is removed from blood spots and absorbed by the molecular sieve. In the case of an immediate decrease in internal RH conditions inside kits compared with the external environment, as was detected in the RH curves for the field simulation, it is reasonable to assume that drying conditions inside the container are better than open-air drying under similar conditions of high humidity within a minute of sealing the container. These findings suggest the kits would be a preferred method of DBS collection over the current protocol in conditions low to moderate or high humidity.

Stress tests indicated that molecular sieve desiccants do, in fact, retain moisture even under extreme temperature conditions, and may therefore be the preferred desiccant of choice for maintaining a near moisture free environment around DBS samples when in transport and storage, particularly in field settings where temperature conditions cannot be controlled. Extended storage tests suggest that kits can be effectively used as storage containers for a minimum of 14 days. Taken together with improvements in drying times, study findings suggest that the novel DBS collection and storage kits are a preferred method for DBS sampling in field settings by removing the requirement of open-air drying, allowing for immediate storage, and potentially improving data quality by stabilizing analytes and preventing contamination. Improvements in analyte stability due to faster or more consistent drying times, particularly for metabolites, RNA, and other classes of analytes, which are susceptible to degradation by hydrolysis, are described herein.

Study limitations around ambient conditions for experimentation, storage times and stressing should be noted. As molecular sieve desiccant action is temperature dependent, additional experimentation with use of the novel kits should include a wider range of ambient temperatures [25]. Longer storage times would also provide a benefit to potential end-users. Stress testing of kits under extremes greater than 38° C. may also be warranted as field conditions could easily exceed the upper limit of the heat conditions of the stress test. Use of fresh blood, rather than sodium citrate treated blood should also be tested as anticoagulant use may affect drying rate of blood spots.

Conclusion

The novel DBS collection and storage kits developed can enable improved field use of DBS by removing the requirement for open-air drying and allowing quick storage after collection with overall improvements in blood spot drying times. Immediate storage and faster drying times could reduce the logistical constraints around DBS collection in the field, prevent possible sample contamination, and provide for overall improvements in data quality.

REFERENCES FOR EXAMPLE 1

1. Demirev, Plamen A. "Dried blood spots: analysis and applications." Analytical chemistry 85.2 (2012): 779-789.
2. Hannon, W. Harry, and Bradford L. Therrell. "Overview of the history and applications of dried blood samples." Dried blood spots: applications and techniques (2014): 1-15.
3. Corso, Gaetano, et al. "A powerful couple in the future of clinical biochemistry: in situ analysis of dried blood spots by ambient mass spectrometry." Bioanalysis 2.11 (2010): 1883-1891.
4. Freeman, Jeffrey, et al. (2017). State of the Science in Dried Blood Spots. Manuscript in preparation.
5. McDade, Thomas W. "Development and validation of assay protocols for use with dried blood spot samples." American Journal of Human Biology 26.1 (2014): 1-9.
6. McDade, Thomas W., Sharon Williams, and J. Josh Snodgrass. "What a drop can do: dried blood spots as a minimally invasive method for integrating biomarkers into population-based research." Demography 44.4 (2007): 899-925.
7. Sadones, Nele, et al. "Spot them in the spot: analysis of abused substances using dried blood spots." Bioanalysis 6.17 (2014): 2211-2227.
8. Meesters, Roland J W, and Gero P. Hooff. "State-of-the-art dried blood spot analysis: an overview of recent advances and future trends." Bioanalysis 5.17 (2013): 2187-2208.
9. Edelbroek, Peter M., Jacques van der Heijden, and Leo M L Stolk. "Dried blood spot methods in therapeutic drug monitoring: methods, assays, and pitfalls." Therapeutic drug monitoring 31.3 (2009): 327-336.
10. Chace, Donald H., Theodore A. Kalas, and Edwin W. Naylor. "Use of tandem mass spectrometry for multianalyte screening of dried blood specimens from newborns." Clinical Chemistry 49.11 (2003): 1797-1817.
11. Demirev, Plamen A. "Dried blood spots: analysis and applications." Analytical chemistry 85.2 (2012): 779-789.
12. Mei, Joanne V., et al. "Use of filter paper for the collection and analysis of human whole blood specimens." The Journal of nutrition 131.5 (2001): 1631S-1636S.
13. Stove, Christophe P., et al. "Dried blood spots in toxicology: from the cradle to the grave?." Critical reviews in toxicology 42.3 (2012): 230-243.
14. Timmerman, Philip, et al. "EBF recommendation on the validation of bioanalytical methods for dried blood spots." Bioanalysis 3.14 (2011): 1567-1575.
15. Smit, Pieter W., et al. "An overview of the clinical use of filter paper in the diagnosis of tropical diseases." The American journal of tropical medicine and hygiene (2013): 13-0463.
16. Sharma, Abhisheak, et al. "Dried blood spots: concepts, present status, and future perspectives in bioanalysis." Drug testing and analysis 6.5 (2014): 399-414.
17. Edelbroek, Peter M., Jacques van der Heijden, and Leo M L Stolk. "Dried blood spot methods in therapeutic drug monitoring: methods, assays, and pitfalls." *Therapeutic drug monitoring* 31.3 (2009): 327-336.
18. Kane, Coumba Toure, et al. "Quantitation of HIV-1 RNA in dried blood spots by the real-time NucliSENS EasyQ HIV-1 assay in Senegal." *Journal of virological methods* 148.1 (2008): 291-295.
19. Amellal, B., C. Katlama, and V. Calvez. "Evaluation of the use of dried spots and of different storage conditions of plasma for HIV-1 RNA quantification." *HIV medicine* 8.6 (2007): 396-400.
20. Denniff, Philip, and Neil Spooner. "Effect of storage conditions on the weight and appearance of dried blood spot samples on various cellulose-based substrates." *Bioanalysis* 2.11 (2010): 1817-1822.
21. Denniff, Philip, Lynsey Woodford, and Neil Spooner. "Effect of ambient humidity on the rate at which blood spots dry and the size of the spot produced." *Bioanalysis* 5.15 (2013): 1863-1871.
22. Mei, Joanne. "Dried blood spot sample collection, storage, and transportation." Dried Blood Spots: Applications and Techniques (2014): 21-31.
23. Mei, Joanne V., et al. "Use of filter paper for the collection and analysis of human whole blood specimens." The Journal of nutrition 131.5 (2001): 1631S-1636S.
24. Belcher, John. et al. "Current and Resistance." MIT OpenCourseware. Massachusetts Institute of Technology. Spring 2007:2-4. Web. 18 Mar. 2017.
25. Golubovic, Mihajlo N., Hettiarachchi, H., and William M. Worek. "Sorption properties for different types of molecular sieve and their influence on optimum dehumidification performance of desiccant wheels." *International journal of heat and mass transfer* 49.17 (2006): 2802-2809.

Supplementary Materials

Optimization Experiments

Goal: The goal of the optimization experiments was to determine an optimal amount of molecular sieve for drying the internal conditions of the novel DBS kits as based on the volume of space within the container, choice of filter paper card, and likely moisture content introduced into the closed system by inclusion of a freshly spotted filter paper card.

Outcome Measure: The outcome measure of interest for optimization experiments was Time to Decline (TTD), defined here as the minutes required from the start of the experiment for the relative humidity (RH) inside kits to begin to reduce suggesting desiccant is effectively controlling internal moisture and drying the environment around the spotted filter paper card.

Materials: Kit containers were procured directly from Elemental Container (product #0075152); 10 g molecular sieve desiccant packets (product #02-00041AG19) and Whatman 903 cards (product #10531018) were procured from Sigma-Aldrich; wireless bluetooth enabled RH/temperature HOBO data loggers (product #MX1101) were procured from ONSET; and 200 microliter adjustable pipettes (product #3121000082) were procured from Eppendorf.

Process: Increasing amounts of molecular sieve were included inside kit containers along with filter paper cards freshly spotted with 4 drops of 30 uL amounts of water by micropipette, and a HOBO sensor for measuring relative humidity (RH) and temperature inside the closed-system containers. External temperature and humidity were controlled at 25.6° C. and 35% RH respectively. The moisture inside the kit containers was measured throughout experimentation with relative humidity by HOBO sensors at 1-minute increments. To carry out the experiment, investigators started the data logger, then spotted filter paper cards, and immediately stored the card inside the kit along with a pre-defined amount of molecular sieve, and an ONSET data logger. Experiments were carried out under ambient lab conditions (25.6° C. and 35% RH), and included 6 replicates. Temperature and RH conditions in the lab were monitored throughout experiments. Experiments were carried out for 24 hours, after which time containers were unsealed, HOBO sensors stopped, and data downloaded in Excel and CSV formats. Data was then imported into Stata version 13.1 for analysis. Each experiment contained a pre-defined amount of molecular sieve for each 10 gram increment between 0 grams and 100 grams.

Analysis: The mean and standard deviation for TTD of each experimental run (i.e. 6 replicates of pre-defined 10 gram molecular sieve amount) was calculated. A two-sample t-test for comparing mean TTDs between experimental groups was used for determining the optimal amount of sieve, which is defined here as the lowest 10 gram increment of sieve with a significantly faster TTD above the previous 10 gram increment, plus 10 grams excess sieve for long-term storage. The 10 grams of excess sieve was included in the kit's optimal sieve amount in order to maintain a near moisture free environment over extended periods of storage. Near moisture free environment is defined here as a detected RH level of less than 0.01%.

Results

The lowest incremental amount of molecular sieve with a significantly faster TTD compared with the previous increment was 30 grams (df=10, t=3.77, p=0.0037, 95% CI; Table 1-2). Based on predefined criteria for optimal desiccant quantity, investigators selected 40 grams molecular sieve as optimal amount of desiccant for inclusion in kits. 40 grams molecular sieve represents 10 grams in excess of the lowest sieve amount with a significantly faster TTD above the previous 10 gram increment of sieve.

TABLE 1-2

Optimization experimental findings for mean TTD with two sample t-test comparisons between experimental group means.

| Amount desiccant | Mean TTD, standard deviation (n = 6) | Two sample t test df = 10, 95% CI |
|---|---|---|
| 10 grams | 33.50 minutes, 3.51 | Not applicable |
| 20 grams | 31.17 minutes, 1.33 | t = 1.52, p = 0.1585 (compared w/10 g) |
| 30 grams | 26.83 minutes, 2.48 | t = 3.77, p = 0.0037 (compared w/20 g) |
| 40 grams | 28.67 minutes, 0.82 | t = 1.72, p = 0.1166 (compared w/30 g) |
| 50 grams | 27.17 minutes, 1.72 | t = 0.27, p = 0.7925 (compared w/30 g) |
| 60 grams | 23.67 minutes, 4.37 | t = 1.54, p = 0.1536 (compared w/30 g) |
| 70 grams | 25.33 minutes, 3.27 | t = 0.90, p = 0.3915 (compared w/30 g) |
| 80 grams | 29.50 minutes, 1.87 | t = 2.10, p = 0.0620 (compared w/30 g) |
| 90 grams | 32.50 minutes, 2.07 | t = 4.29, p = 0.0016 (compared w/30 g) |
| 100 grams | 26.00 minutes, 4.69 | t = 0.38, p = 0.7086 (compared w/30 g) |

Note, the difference in TTD for 90 grams compared with 30 grams was significant, however, the mean TTD for 90 grams was significantly slower than 30 grams and is therefore not considered optimal.

Example 2

Introduction

Methods for the collection and use of biological specimens (biosamples) for biological marker (biomarker) measurement are essential tools in public health and medicine. Biosamples are used routinely in basic research, as well as in public health practice for surveillance and population-based studies among other applications [1-6]. Biosamples are also critical tools in clinical medicine. For example, biomarkers are commonly used for characterizing health status, diagnosing disease, and therapeutic drug treatment monitoring [2, 7]. Traditional biosamples, such as venous whole blood, plasma, and serum, however, may pose significant challenges in collection and storage outside of the clinic, hospital, or laboratory settings [8]. Venous blood sample collection requires a trained phlebotomist as well as refrigeration or freezing of blood or blood constituents from time of collection until time of analysis, i.e., sustaining a reliable cold chain. In many environments, especially in remote or austere settings where phlebotomy and/or cold chain may not be available nor financially or logistically feasible [8-9].

An alternative method to the collection of venous whole blood, plasma, and serum in nontraditional, remote, or austere settings is dried blood spot (DBS) sampling. DBS is a minimally invasive method for the collection of small quantities of whole blood from finger or heel stick with transfer to specially designed filter paper cards for storage and transport [10]. Historically, DBS has been used in newborn screening programs, and is the most commonly used type of dried microsample in research, public health, and medicine [11-12]. Among the advantages of DBS sampling methods, the ability to obtain a blood sample without a trained phlebotomist or cold chain has positioned DBS as a potential biosample matrix for use in non-traditional environments, and especially in remote and austere settings [8-9]. In recent years, as advancements in highly sensitive lab instrumentation and analytic software have emerged, interest in the use of DBS has increased, however, challenges in field collection remain an impediment to wider adoption [13-15]. Specifically, current recommendations in DBS methods require open-air drying for a minimum of 3 hours prior to storage and transport [16]. This requirement can be especially problematic in the field where space for drying may not be available, and prolonged open-air drying could allow for sample contamination from dust, insects, and other environmental exposures [17-20]. Furthermore, variable drying conditions can significantly alter biomarker measurements. This is particularly problematic for biomarkers that are susceptible to hydrolysis or other processes that utilize water for degradation as greater variability in drying times result in greater variability in biomarker measurements [21-24]. Evidence-based improvements in field collection of DBS samples would greatly facilitate wider adoption of the methodology.

Certain embodiments of the present disclosure relate to methods for the field collection of DBS samples that control contamination and air drying. These methods utilize small, opaque, air-tight kits with experimentally optimized amounts of molecular sieve desiccant for quickly drying DBS samples within a protected and closed environment. Related kits enable faster drying times compared with open-air drying in similar environments, and an ability to reduce variability in drying conditions—i.e., kits have the ability to consistently dry DBS samples in less than 90 minutes in low, moderate, or high humidity conditions. The ability to store DBS samples quickly after collection removes the requirement of open-air drying, which is likely to reduce the chance for sample contamination.

Faster drying rates in combination with less variation in drying conditions between sample collections improves the precision of biomarker measurements from DBS samples, especially for biomarkers that are susceptible to degradation by hydrolysis or other processes utilizing water. Less variation in drying conditions alone is an important improvement as it can improve overall data quality. The objective of the present example was to examine the performance of novel methods in DBS collection compared with current methods with respect to an analyte that is both broadly relevant to biomedical research and clinical health monitoring, and subject to hydrolytic degradation in storage-messenger RNA (mRNA). Current methods were defined as those presently recommended by the United States Centers for Disease Control and Prevention (CDC), which requires open-air drying for a minimum of three hours followed by storage in sealable, airtight, plastic bags with silica gel desiccant [16].

The selection of mRNA as the biomarker for this study was based on two factors. First, mRNA is a particularly problematic biomarker in traditional biosamples due to the effect of RNAse, which is ubiquitous in the biosamples themselves, as well as in the environment, and quickly degrades mRNA [23, 25, 26]. As RNAse requires water for its degradation processes, faster or less variable drying rates could result in improved performance for DBS compared with traditional samples [26-28]. Second, current gold standard methods in mRNA analysis often require use of vacutainers and RNA stabilizing agents (e.g. PAXgene RNA Blood Tubes, RNAlater, etc.) following by freezing the biosample, which increases the overall cost and technical requirements for field collection and storage of biosamples, which may not be feasible in some settings [29]. The ability to use the DBS collection methods described herein in the field for detection and quantification of mRNA in biosamples could remove many of the existing hurdles to DBS adoption, especially in resource limited environments. It was hypothesized that the DBS collection methods of the present disclosure would demonstrate an overall improvement in performance for the detection and quantification of mRNA from DBS samples compared with current methods.

Materials and Methods

Study Context and Design

Study subjects were recruited and samples collected under informed consent at Johns Hopkins Medical Institutions in Baltimore, Maryland. Research protocols were approved by the Institutional Review Board (IRB) at the Johns Hopkins Bloomberg School of Public Health (IRB No: 00007621). A total of 18 subjects were enrolled prior to sample collection, and all biosamples were collected on a single day. Samples from two subjects were removed from the study due to protocol deviations during sample collection. Sample size and the use of triplicate assay determinations (see Nucleic Acid Amplification and Determination) were based on best practices in the scientific literature and FDA guidance for bioanalytical method development [31-32]. The only inclusion criteria for subjects was that they be between the ages of 18 and 49 years. The study design included a validation of assay protocol for comparing mRNA measurements between DBS methodologies (aka, sampling modalities) and liquid venous blood samples collected under gold standard laboratory methods using PAXgene Blood RNA Tubes (see Sample Collection and Preparation). Three gene transcripts associated with immune function were selected as the target mRNA biomarkers (GBP5, DUSP3, KLF2), and one well-established housekeeping gene transcript for normalization of mRNA measurements (GAPDH) [33-36]. The target transcripts were selected based on commercial availability of probes for qRT-PCR and the requirement that they be constitutively expressed—i.e., transcripts were selected that should be present at detectable levels in all study subjects irrespective of their individual health status or other factors.

Sample Collection and Preparation

A total volume of 30 mL venous blood was collected from each study subject by a trained phlebotomist with a standard venipuncture collection protocol at JHMI. The first 10 mL of blood were collected directly into a PAXgene RNA blood tube from BD Biosciences (Product No. 762165) containing anticoagulant and an RNA stabilizing agent. The remaining 20 mL were collected into a syringe containing citrate dextrose anticoagulant solution. PAXgene RNA blood tube samples, hereafter referred to as gold standard, served as the gold standard comparison for mRNA measurements. Gold standard samples for all study subjects were paired with matched DBS samples prepared under two different protocols. Both the PAXgene tubes and syringes were transported from the phlebotomy room to the lab (on the same floor as the phlebotomy room) for sample preparation and storage immediately following collection. PAXgene tubes were placed into a −20° C. freezer while the blood in the syringe, which contained citrate dextrose anticoagulant solution, was divided into four 5 ml conicals for DBS sample preparation. Four 30 μL drops of blood were spotted by micropipette onto Whatman 903 filter paper cards under ambient lab conditions (47-53% RH, 22-23° C.).

DBS samples were prepared and stored under two different DBS protocols. DBS protocol 1, hereafter referred to as novel methods, included use of the novel methodologies developed for enabling field collection of DBS samples. These methods include use of Whatman 903 filter paper cards from GE Healthcare Life Sciences (Product No. 10531018) with immediate storage after blood spotting into 644 mL aluminum, opaque, cylindrical containers with screw-on caps from Elemental Container (Product No. 0075152). Each kit contains an experimentally optimized 40 g of molecular sieve desiccant from Multisorb Technologies (Product No. 02-00041AG19) for the purpose of quickly drying freshly spotted DBS samples within a closed system.

DBS protocol 2, hereafter referred to as current methods, is the current protocol for DBS collection and storage as recommended by CDC [16]. The current methods include use of Whatman 903 filter paper cards, which are open-air dried on a rack for a minimum of 3 hours prior to storage. Once dry, DBS cards are placed inside glassine envelopes and plastic bags along with humidity indicator cards, and silica gel desiccants for maintaining a low-moisture environment during storage and transport. The study used Whatman glassine envelopes (Product No. 28417400), Whatman plastic bags (Product No. 28417398), Humonitor humidity indicator cards (Product No. 2291DG03), and silica gel desiccant packs (Product No. 02-00040AG45). All DBS materials for the current methods were procured from Sigma-Aldrich. After 24 hours following spotting, samples were prepared for shipment to the UCLA Social Genomics Core in Los Angeles, California for mRNA extraction and analysis. PAXgene tubes were shipped on dry ice, while DBS samples collected under both novel and current methods were shipped overnight under ambient conditions (not recorded). After receipt at UCLA, PAXgene tubes were stored in a −20° C. freezer and DBS samples stored under ambient conditions (not recorded) for two weeks until mRNA extraction and assay.

Nucleic Acid Extraction

Total mRNA was extracted from PAXgene Blood RNA Tube samples using an automated nucleic acid processing system (Qiagen QIAcube) following a standard protocol derived from the PAXgene Blood RNA Kit Handbook from Qiagen [50]. Total mRNA was extracted from DBS samples by suspending sheared DBS filter papers for 30 min in Qiagen RLT buffer (at 37° C. with agitation) followed by extraction using an automated nucleic acid processing system (Qiagen QIAcube) following a standard protocol derived from the RNeasy® Micro Handbook from Qiagen and modified per manufacturer's instructions for DBS processing [51].

Nucleic Acid Amplification and Determination mRNA samples were assayed using standard qRT-PCR protocols implemented on a Bio-Rad iQ5 real-time PCR system using reverse transcriptase and polymerase chain reaction enzymes and buffers appropriate for fluorescent probe-based detection (Qiagen QuantiTect® Probe PCR Kit) and standard commercially available primer/probe systems (Applied Biosystems TaqMan® Gene Expression Assays Hs00369472_m1, Hs01115776_m1, Hs00360439_g1, and Hs02786624_g1). Reverse transcription and PCR thermal cycling protocols followed the assay manufacturer's specified time/temperature profiles. Procedures for mRNA amplification and quantitation followed a UCLA protocol adapted from the QuantiTect® Probe PCR Handbook from Qiagen [52]. All measurements were conducted in triplicate with median $C_t$ values reported as final mRNA measurements for each of the gene transcripts. $C_t$ values were then normalized to delta $C_t$ values for statistical analysis. Delta $C_t$ values were calculated for each of the three target gene transcripts by subtracting the corresponding $C_t$ values of the housekeeping transcript (GAPDH), for the same sample and analytical run, from the target transcript. Due to the study design, Delta Delta $C_t$ values were not considered for analysis. Delta Delta $C_t$ calculations require an assumption of equal amplification efficiency, which could not be assumed due to our use of different collection modalities, which was required for testing the study hypothesis.

Statistical Analysis

The performance of both DBS methods was evaluated against each other as well as against the gold standard. Detection performance was evaluated by percentage of samples detected above threshold levels, defined here as the percentage of samples within a sampling modality that yielded detectable mRNA measurements above an auto-calculated threshold level (i.e., the Bio-Rad iQ5 PCR instrument's default algorithm was used for identifying a valid detection threshold above background). These measurements enabled the examination of the extent to which the methods impacted the ability to detect mRNA from DBS samples. Quantitative performance was evaluated by descriptive statistics for each sampling modality (mean Delta $C_t$ values and corresponding coefficient of variation), correlation and linear regression, Bland-Altman analysis, and Wilcoxon matched-pairs signed rank tests [37-39]. Mean delta $C_t$ and corresponding CV values were used in order to examine how the methods impact variability of mRNA measurements from DBS. Correlation and linear regression were used to examine the degree to which the methods effect comparability of DBS measurements with gold standard. Bland-Altman analysis was used to examine the respective bias of the novel methods compared with gold standard in contrast to the current methods compared with gold standard. Finally, Wilcoxon matched-pairs signed rank tests were used to determine if mRNA measurements derived from the methods were significantly different from current methods as well as from the gold standard. Significance levels for comparative analyses were set at $\alpha=0.05$. All analyses were conducted with statistical software program, GraphPad Prism 7.0b.

Results

Results are presented for mRNA measurements for three target gene transcripts (GBP5, DUSP3, KLF2), and one housekeeping transcript (GAPDH). mRNA measurements were taken from blood samples from 16 subjects for two sets of matched DBS samples collected under our novel and current methods paired with PAXgene Blood RNA Tubes as gold standard. No personal identifying information of any kind was collected nor reported on study subjects.

Percentage Detection Above Threshold

To assess sampling modality performance on mRNA detection, the percent of samples achieving detectable mRNA above threshold levels were reported for all 16 samples collected under each of the three sampling modalities (Table 2-1). 100% of samples collected under gold standard methods yielded detectable mRNA levels for all three target gene transcripts as well as for the housekeeping transcript. As expected, gold standard methods outperformed both DBS sampling modalities. Findings suggest the novel methods had comparable performance in detection with current methods. Specifically, 100% of samples collected under novel methods versus 93.8% for current methods yielded detectable levels of GBP5; 81.3% yielded detectable levels of DUSP3 for both novel and current methods; 81.3% for novel methods versus 93.8% for current methods yielded detectable levels of KLF2; and lastly, 93.8% of samples collected by both novel and current methods yielded detectable levels of mRNA for GAPDH (housekeeper).

TABLE 2-1

Percentage of samples achieving detectable RNA above threshold levels.

| Gene Transcript | RNA Detection | | |
|---|---|---|---|
| | Gold Standard (PAXgene Tube) | Novel Methods | Current Methods |
| GBP5 (n = 16) | 100% | 100% | 93.8% |
| DUSP3 (n = 16) | 100% | 81.3% | 81.3% |
| KLF2 (n = 16) | 100% | 81.3% | 93.8% |
| GAPDH, house-keeper (n = 16) | 100% | 93.8% | 93.8% |

Mean Delta C: Values and Coefficient of Variation

Mean delta $C_t$ values and corresponding coefficients of variation (CV) were reported for comparing quantitative performance. Mean delta $C_t$ values for novel methods were closer to gold standard measurements for 2 of 3 transcripts, and CVs for all 3 transcripts were less dispersed than were values from samples collected under current methods (Table 2-2). Specifically, GBP5 (n=14) mean delta $C_t$ values were reported as 1.64 (CV=62.9%), 1.14 (CV=137.2%), and 0.62 (CV=241.2%) for gold standard, novel methods, and current methods respectively. Mean delta $C_t$ values for DUSP3 (n=8) were reported as 3.12 (15.6%), 2.82 (45.2%), and 2.11 (66.0%) for gold standard, novel, and current methods respectively. Mean delta $C_t$ values for KLF2 (n=12) were reported as 1.20 (CV=38.3%), 2.14 (41.9%), and 1.41 (48.0%) for gold standard, novel, and current methods respectively.

TABLE 2-2

Descriptive statistics for mRNA measurements.

| Gene Transcript | Mean Delta $C_t$ Values + Coefficient of Variation | | |
|---|---|---|---|
| | Gold Standard (PAXgene) | Novel Methods | Current Methods |
| GBP5 (n = 14) | 1.64 + 62.9% | 1.14 + 137.2% | 0.62 + 241.2% |
| DUSP3 (n = 8) | 3.12 + 15.6% | 2.82 + 45.2% | 2.11 + 66.0% |
| KLF2 (n = 12) | 1.20 + 38.3% | 2.14 + 41.9% | 1.41 + 48.0% |

Wilcoxon Matched-Pairs Signed Rank Tests

Wilcoxon matched-pairs signed rank tests were also used to compare matched delta $C_t$ values for each of the three target gene transcripts for novel vs. gold standard, current vs. gold standard, and novel vs. current methods (Table 2-3). Delta $C_t$ values for novel methods were not significantly different from gold standard for GBP5 (p=0.1205, n=15) or DUSP3 (p=0.2810, n=13), whereas delta $C_t$ values for current methods were significantly different for both GBP5 (p=0.0045, n=15), and DUSP3 (p=0.0339, n=13). Delta $C_t$ values for novel and current methods were both significantly different from gold standard for KLF2 (p=0.0005, n=13; p=0.0026, n=15); however, they were not significantly different from each other (p=0.3013, n=12).

TABLE 2-3

Wilcoxon matched-pairs signed rank tests for comparing mRNA measurements between sampling modalities.

| Gene Transcript | P Values (significance level set at P < 0.05), Number of Pairs | | |
|---|---|---|---|
| | Novel vs. Gold Standard (PAXgene) | Current vs. Gold Standard (PAXgene) | Novel vs. Current |
| GBP5 | 0.1205, n = 15 | 0.0045, n = 15 | 0.1575, n = 14 |
| DUSP3 | 0.2810, n = 13 | 0.0339, n = 13 | 0.1475, n = 11 |
| KLF2 | 0.0005, n = 13 | 0.0026, n = 15 | 0.3013, n = 12 |

Correlation Statistics and Linear Regression

Figure 13:
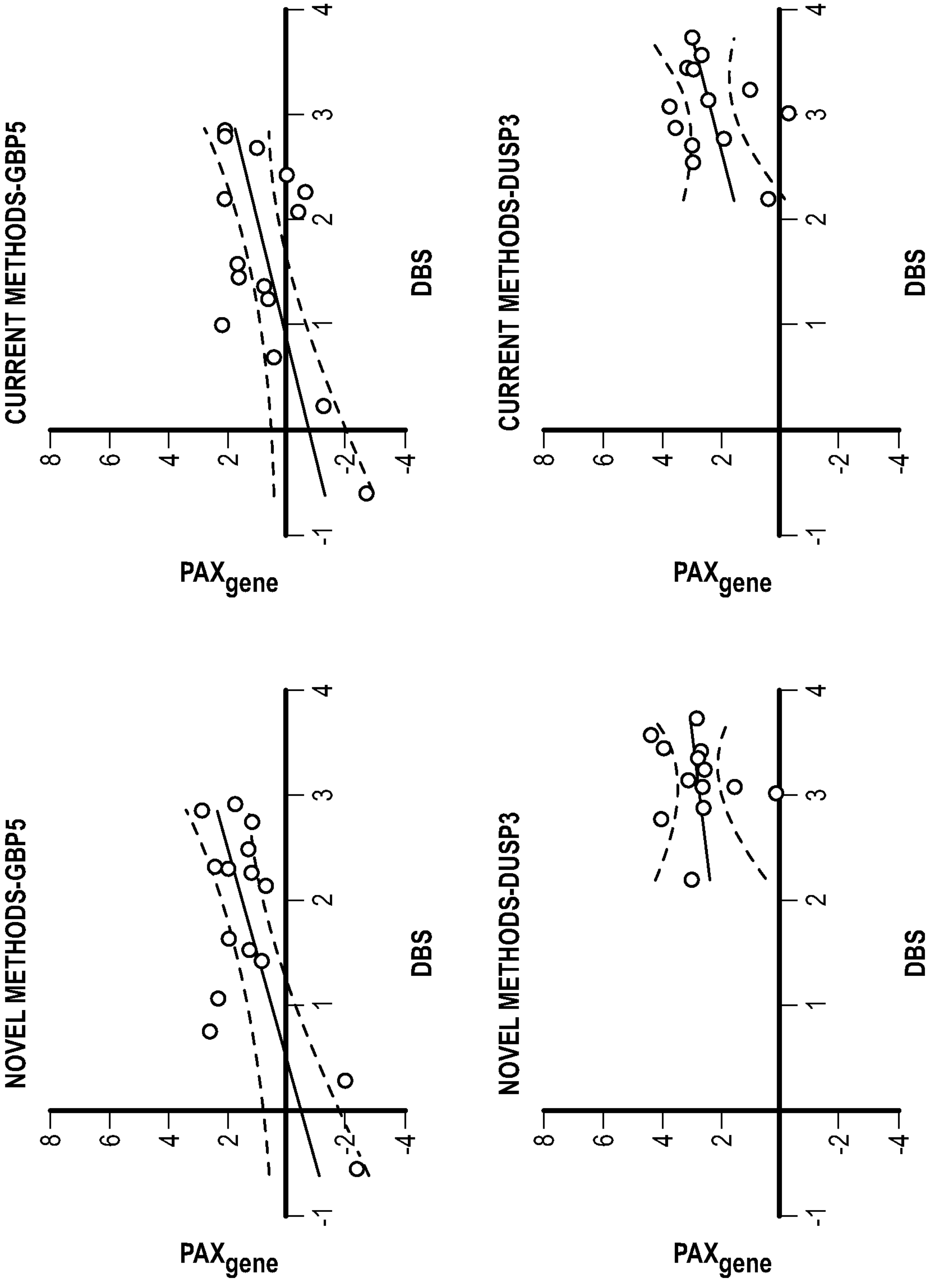
FIG. 13 are plots showing regression analyses for mRNA measurements in novel and current DBS methods compared with Gold Standard (PAXgene).
Figure 13:
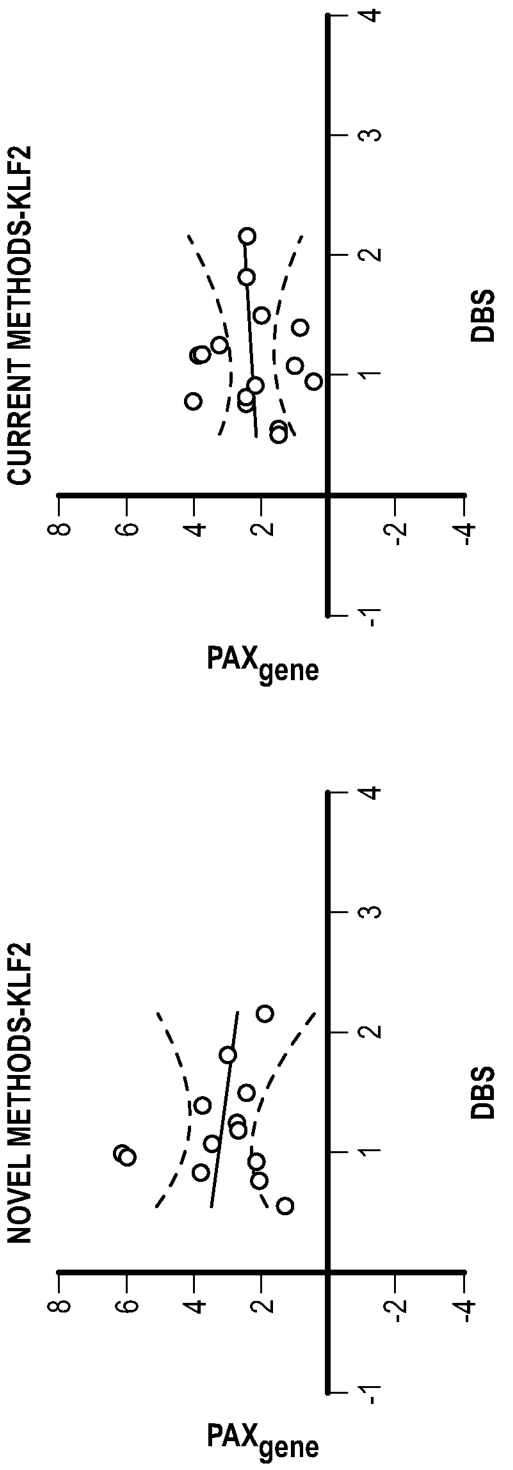

Correlation statistics are reported for novel and current methods compared with gold standard (Table 2-4) as well as compared with each other (Table 2-5). Linear regression plots are reported for novel and current methods compared with gold standard (FIG. 13). Findings suggest novel methods had a neutral effect on quantification of mRNA compared with current methods as it pertains to correlation with gold standard. Specifically, both novel and current methods yielded significant positive correlations with gold standard for GBP5 (r=0.66, p=0.0070; r=0.60, p=0.0178), whereas neither method yielded significant correlation with gold standard for DUSP3 or KLF2. Novel and current methods were also significant positively correlated with each other for GBP5 (r=0.7442, p=0.0023), but not for DUSP3 or KLF2 (r=0.499, p=0.1182; r=−0.5076, p=0.920).

TABLE 2-4

Correlation statistics for mRNA measurements of novel and current DBS methods compared with Gold Standard (PAXgene).

| Protocol/Transcript | Pearson r | 95% Confidence Limits | R squared | P value |
|---|---|---|---|---|
| Novel/GBP5 (n = 15) | 0.66 | 0.23 to 0.88 | 0.44 | 0.0070 |
| Current/GBP5 (n = 15) | 0.60 | 0.13 to 0.85 | 0.36 | 0.0178 |
| Novel/DUSP3 (n = 13) | 0.16 | −0.43 to 0.65 | 0.02 | 0.6132 |
| Current/DUSP3 (n = 13) | 0.33 | −0.28 to 0.74 | 0.11 | 0.2804 |
| Novel/KLF2 (n = 13) | −0.14 | −0.64 to 0.45 | 0.02 | 0.6583 |
| Current/KLF2 (n = 15) | 0.10 | −0.44 to 0.58 | 0.01 | 0.7343 |

TABLE 2-5

Correlation statistics for mRNA measurements from novel DBS methods compared with current methods.

| Gene Transcript | Pearson r | 95% Confidence Limits | R squared | P value |
|---|---|---|---|---|
| GBP5 (n = 14) | 0.7442 | 0.353 to 0.9139 | 0.5539 | 0.0023 |
| DUSP3 (n = 11) | 0.499 | −0.144 to 0.8457 | 0.249 | 0.1182 |
| KLF2 (n = 12) | −0.5076 | −0.8375 to 0.0935 | 0.2577 | 0.0920 |

Inspection of linear regression plots (FIG. 13) and CV values (Table 2-2) suggests that the relatively poor correlation of DBS-derived results with gold standard results for DUSP3 and KLF2 may stem in part from the relatively restricted range of underlying biological variation for these two transcripts relative to GBP5. Regression analysis shows clustering of values within a limited range of biological variation for both DUSP3 and KLF2 (both ~4-fold range of variation) whereas GBP5 showed substantially greater variation across participants (~16-fold range). Note that these differences do not represent any decrement in assay precision for DUSP3 and KLF2 as replicate determinations actually showed lower CV values for these two analytes than did GBP5.

Bland-Altman Analysis

Figure 14:
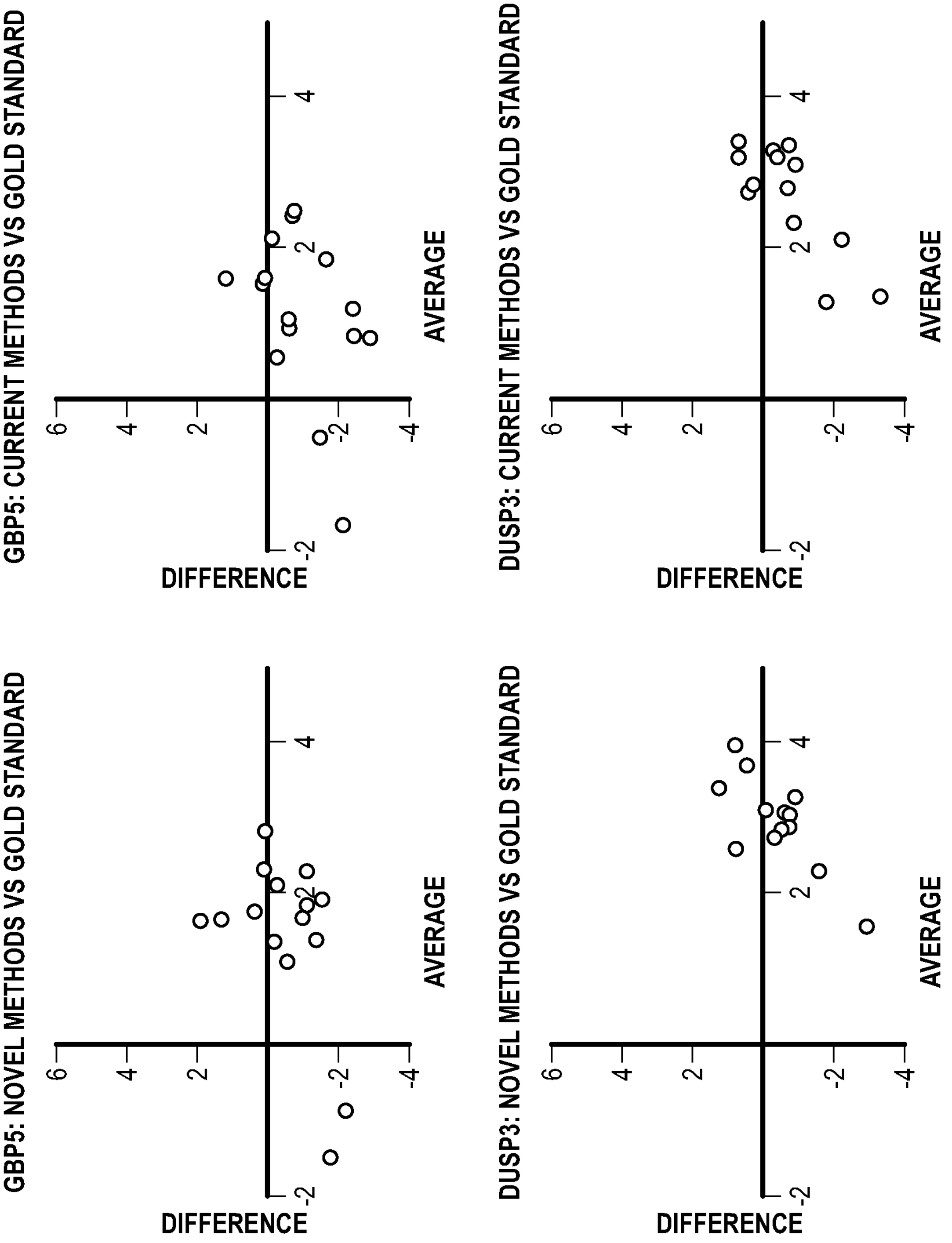
FIG. 14 are plots showing Bland-Altman Analyses for mRNA measurements comparing DBS samples to Gold Standard (PAXgene).
Figure 14:
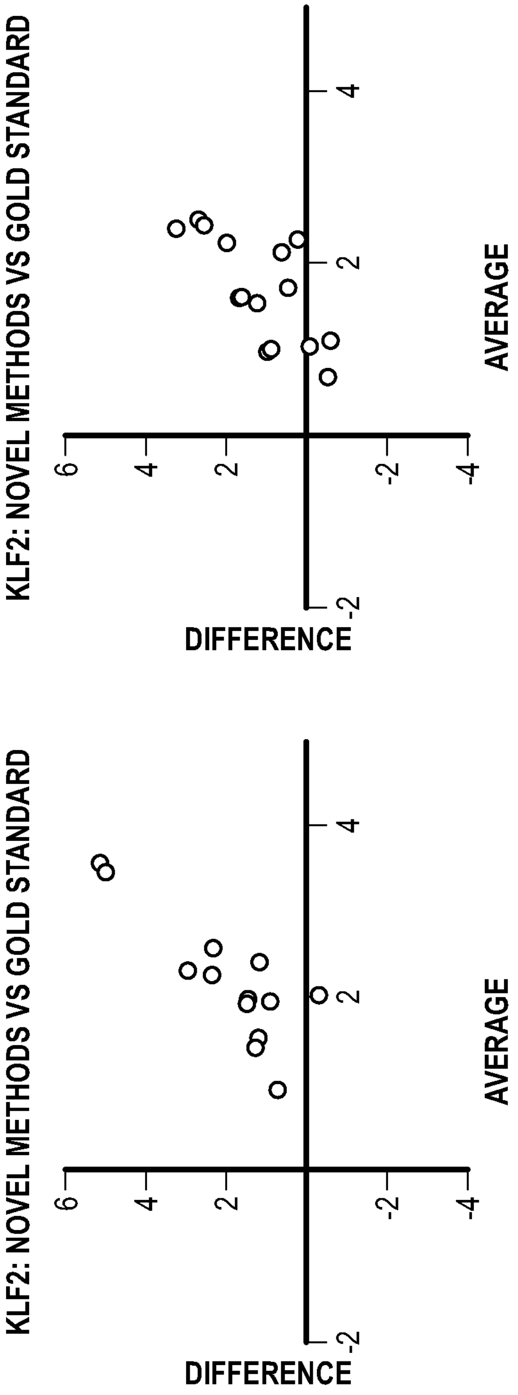

Findings from Bland-Altman analysis suggest novel methods had an overall neutral to positive effect on mRNA quantification as estimated biases for novel methods were smaller than for current methods in absolute terms (and comparable in confidence interval length) for 2 of 3 transcripts (GBP5 and DUSP3) (Table 2-6). Specifically, novel methods yielded biases of −0.4827 (−2.717 to 1.752) for GBP5, −0.3923 (−2.565 to 1.78) for DUSP3, and 1.982 (−1.142 to 5.107) for KLF2. These values compare favorably with current methods' bias statistics of −0.9927 (−3.267 to 1.282), −0.7115 (−3.026 to 1.603), and 1.121 (−1.151 to 3.392), respectively. Bland-Altman plots show similar distribution of biases for both DBS methods (FIG. 14). Specifically, bias for novel and current methods cluster around zero for both GBP5 and DUSP3, with greater bias detected at lower delta $C_t$ values. In contrast, bias for novel and current methods cluster above zero for KLF2, with greater detected bias at higher delta $C_t$ values.

TABLE 2-6

Detected bias (Bland-Altman) for mRNA measurements from novel and current DBS methods compared with Gold Standard (PAXgene).

| Protocol/Transcript | Bias | 95% Confidence Limits |
|---|---|---|
| Novel/GBP5 (n = 15) | −0.4827 | −2.717 to 1.752 |
| Current/GBP5 (n = 15) | −0.9927 | −3.267 to 1.282 |
| Novel/DUSP3 (n = 13) | −0.3923 | −2.565 to 1.78 |
| Current/DUSP3 (n = 13) | −0.7115 | −3.026 to 1.603 |
| Novel/KLF2 (n = 13) | 1.982 | −1.142 to 5.107 |
| Current/KLF2 (n = 15) | 1.121 | −1.151 to 3.392 |

Discussion

These findings suggest, for example, that the novel methods in DBS collection and storage had a neutral effect on performance for detection and a positive effect on the quantification of mRNA by RT-PCR when compared with current DBS methods recommended by CDC. As previously noted, even a neutral effect on assay results would be valuable as the novel methods eliminate one of the biggest impediments to wider adoption of DBS sampling in the field, specifically, the requirement for extended open-air drying. By enabling immediate storage after sample collection, DBS can be used in a range of complex environmental settings, including tropical climates, remote or austere environments, and occupational settings, to name a few. In each of these environments, the technical requirement for extended (3-hour) open-air drying may often be infeasible and could thus prohibit use. Moreover, the elimination of extended open-air drying also substantially reduces the chance of sample contamination. The present findings provide an opportunity to significantly broaden the array of fields in which microsampling is employed, and may enable wider adoption of DBS sampling in non-traditional settings such as remote, austere, and occupational environments.

Though improvements in quantification over current DBS methods were modest, and differences between novel DBS and gold standard methods clearly remain, it should be noted that the study design worked against detecting any material advantages for the novel DBS approach because the laboratory setting employed here lacked many of the ecological challenges that complicate analysis of field-collected biosamples. For example, this experiment was conducted in a lab-based environment under conditions of moderate humidity (limiting the hydrolytic advantage of immediate storage relative to extended drying times). This experiment also compared novel DBS methods not just against current DBS methods but also with gold standard venipuncture sampling. The gold standard methodology benefited from a substantially greater sample volume collected directly into a vacutainer with a stabilizing agent specific for RNA. The gold standard method also benefited from its requirement to freeze samples shortly after collection, whereas both novel and current-method DBS samples were stored under ambient conditions for 2 weeks prior to RNA extraction and analysis. Despite the technical advantages for the gold standard sampling method (which would not be feasible in many field settings), novel and standard DBS assays showed reasonable quantitative correspondence with gold standard results, particularly for the transcript that showed the widest range of intrinsic biological variation (i.e., GBP5, which showed ~4 times greater magnitude inter-individual variation than did other assayed transcripts).

The primary advantages of the novel DBS methods over current DBS methods are their ability to dry samples more quickly, and thereby remove some of the variation in drying conditions, while also minimizing potential sample contamination. Each of these advantages was reduced in the present laboratory setting. However, under the more challenging and variable conditions of field collection, these advantages should in principle reduce the technical variation or noise associated with current DBS collection and storage methods, and thereby increase the assay signal-to-noise ratio by providing a more stable environment. It is reasonable to expect that the observed advantage of novel DBS methods would be more evident in high-humidity field environments where drying conditions would be more variable and humidity more deleterious to RNA integrity [8, 40-42]. Follow-on studies with field application of novel methods may help clarify the analytic impact of these advantages over current methods.

Performance in mRNA detection suggests that novel DBS methods provide a suitable sampling modality when qualitative detection alone is the priority. There are a wide range of nucleic acid-based amplification tests available for infectious disease diagnostics, many of which are most prevalent in tropical or austere environments where traditional sampling modalities are more problematic [43]. Use of novel methods could also allow for substantial improvements in the quality and availability of infectious disease diagnostics in remote or other vulnerable populations where access to basic diagnostic services remains constrained [8-9, 17, 43].

Performance improvements in the quantification of mRNA abundance were less convincing for the novel DBS methods, particularly for two of the three target gene transcripts (i.e., DUSP3 and KLF2). These two transcripts are notable in showing substantially less "true" biological variation across study participants than did GBP5, which showed more impressive correlation in quantitative estimates across sampling modalities. The relatively poor performance of DBS methods in quantification of DUSP3 and KLF2 mRNA did not stem from poorer assay performance, as replicate determination CV values actually showed superior performance for these two assays. Instead, visual inspection of linear regression scatter plots showed substantial less dispersion in the magnitude of true individual differences in average mRNA abundance. Correlations are essentially a ratio of "true" variation across individuals relative to "noise"

variation stemming from sampling variability and/or measurement (assay) error. Holding constant the technical accuracy of an assay, as the range of true biologic variation in the sampled observations goes down ("range restriction"), the correlation between sampling modalities will be reduced, as was seen here for DUSP3 and KLF2. The cause of the differences in biological variation between gene transcripts is less understood. However, GBP5 is known to track innate antiviral responses, so it is possible that the relatively large variation in average expression of this transcript may stem from substantial variation in the number and activity of subclinical viral infections [33, 44-45]. KLF2 and DUSP3 transcripts may be less sensitive to the same kinds of common latent viral infections and thus show relatively less true variation in the generally healthy sample examined here.

It is believed that these findings bode well for the potential field application of the novel DBS methods for two related reasons. First, as noted above, the quantitative performance of novel DBS methods will likely benefit from (or more accurately, suffer less from) the greater technical challenges of complex environments. The primary benefit of novel DBS methods over current DBS methods is removal of the extended open-air drying requirement. This should help reduce technical variation in field settings as novel DBS methods should be less impacted by contamination and/or variable desiccation rates than are current DBS methods. Second, it is important to note that DBS methods will inherently be noisier than gold standard venipuncture methods due to the reduced biosample volume available. However, comparison of DBS accuracy with gold standard venipuncture sample accuracy is not the appropriate conceptual frame from which to consider wider adoption of DBS. In complex occupational and environmental settings, and especially in austere environments, biosampling is often not conducted at all due in large part to the technical and logistical infeasibility of venipuncture as well as costs associated with the immediate processing and storage of those samples [8, 46-47]. The appropriate reference point for assessing the relative value of DBS sampling is, therefore, not the more accurate measurements theoretically available from gold standard, but rather measurements from novel DBS methods compared with no measurements at all (i.e., when no gold standard measurement is feasible).

The study design had several limitations. First, as a proof-of-concept study, the sample size was relatively small compared with full bioanalytical validation studies, which would likely involve a minimum of 40 subjects per best practices in the scientific literature [31, 38]. Second, as previously discussed, the study was conducted in a lab-based environment under conditions of moderate humidity, which limited the ability to detect larger differences between novel and current methods that might have been detected under more variable conditions in the field. Lastly, DBS samples were prepared by precise application of venous blood to filter paper cards by micropipette, whereas the more common application of DBS, especially in field settings, would come from capillary blood by finger stick with direct application to filter paper cards. Though measurements from capillary blood are often found to be highly correlated with venous blood, the additional variability associated with the sampling method could introduce bias [48-49]. For purposes of this study, however, it was chosen to prevent introduction of bias from finger stick application by use of micropipette application in order to more accurately assess the differences between collection and storage protocols for novel and current methods (i.e., holding constant the blood source). This approach was justified by the fact that the present study aimed to measure the variation associated with collection, storage, and assay protocols per se, rather than the additional biological variation associated with capillary versus venous blood, which would apply to both modalities in the field.

REFERENCES FOR EXAMPLE 2

1. Amsterdam P V, Waldrop C. The application of dried blood spot sampling in global clinical trials. Bioanalysis. 2010 November; 2 (11):1783-6.
2. Brindle E, O'Connor K A, Garrett D A. Applications of Dried Blood Spots in General Human Health Studies. Dried Blood Spots: Applications and Techniques. 2014 May 12:114-29.
3. Kulmatycki K, Li W, Xu X L, Jarugula V. Application of Dried Blood Spot Sampling in Clinical Pharmacology Trials and Therapeutic Drug Monitoring. Dried Blood Spots: Applications and Techniques. 2014 May 12:216-28.
4. Lakshmy R, Tarik M, Abraham R A. Role of dried blood spots in health and disease diagnosis in older adults. Bioanalysis. 2014 December; 6 (23):3121-31.
5. Lehmann S, Delaby C, Vialaret J, Ducos J, Hirtz C. Current and future use of "dried blood spot" analyses in clinical chemistry. Clinical chemistry and laboratory medicine. 2013 Oct. 1; 51 (10):1897-909.
6. Liang X, Chen Y L. Dried blood spot (DBS) sampling technique and its applications. CACS Communications. 2010:23-7.
7. Deep A, Kumar P, Kumar A, Thakkar A. Dry blood spot technique: A review. Int J Pharm Sci Rev Res. 2012; 15:90-4.
8. McDade T W, Williams S, Snodgrass J J. What a drop can do: dried blood spots as a minimally invasive method for integrating biomarkers into population-based research. Demography. 2007 Nov. 1; 44 (4):899-925.
9. Parker S P, Cubitt W D. The use of the dried blood spot sample in epidemiological studies. Journal of clinical pathology. 1999 September; 52 (9):633.
10. Hannon W H, Therrell B L. Overview of the history and applications of dried blood samples. Dried blood spots: applications and techniques. 2014 May 12:1-5.
11. Dezateux C. Evaluating newborn screening programmes based on dried blood spots: future challenges. British medical bulletin. 1998 Jan. 1; 54 (4):877-90.
12. Wilcken B. Screening for disease in the newborn: the evidence base for blood-spot screening. Pathology-Journal of the RCPA. 2012 Feb. 1; 44 (2):73-9.
13. Déglon J, Thomas A, Mangin P, Staub C. Direct analysis of dried blood spots coupled with mass spectrometry: concepts and biomedical applications. Analytical and bioanalytical chemistry. 2012 Mar. 1; 402 (8):2485-98.
14. Desai J M, Ravindra R P. Dried blood spot sampling analysis: recent advances and applications. Pharmaceutical, Biological and Chemical Sciences. 2013; 4 (4):34-44.
15. Henion J, Oliveira R V, Chace D H. Microsample analyses via DBS: challenges and opportunities. Bioanalysis. 2013 October; 5 (20):2547-65.
16. Mei J V, Alexander J R, Adam B W, Hannon W H. Use of filter paper for the collection and analysis of human whole blood specimens. The Journal of nutrition. 2001 May 1; 131 (5):1631S-6S.
17. Stove C P, Ingels A S, De Kesel P M, Lambert W E. Dried blood spots in toxicology: from the cradle to the grave? Critical reviews in toxicology. 2012 Mar. 1; 42 (3):230-43.

18. Timmerman P, White S, Globig S, Lüdtke S, Brunet L, Smeraglia J. EBF recommendation on the validation of bioanalytical methods for dried blood spots. Bioanalysis. 2011 July; 3 (14):1567-75.

19. Smit P W, Elliott I, Peeling R W, Mabey D, Newton P N. An overview of the clinical use of filter paper in the diagnosis of tropical diseases. The American journal of tropical medicine and hygiene. 2014 Feb. 5; 90 (2):195-210.

20. Sharma A, Jaiswal S, Shukla M, Lal J. Dried blood spots: concepts, present status, and future perspectives in bioanalysis. Drug testing and analysis. 2014 May 1; 6 (5):399-414.

21. Sadones N, Capiau S, De Kesel P M, Lambert W E, Stove C P. Spot them in the spot: analysis of abused substances using dried blood spots. Bioanalysis. 2014 September; 6 (17):2211-27.

22. Edelbroek P M, van der Heijden J, Stolk L M. Dried blood spot methods in therapeutic drug monitoring: methods, assays, and pitfalls. Therapeutic drug monitoring. 2009 Jun. 1; 31 (3):327-36.

23. Kane C T, Ndiaye H D, Diallo S, Ndiaye I, Wade A S, Diaw P A, et al. Quantitation of HIV-1 RNA in dried blood spots by the real-time NucliSENS EasyQ HIV-1 assay in Senegal. Journal of virological methods. 2008 Mar. 31; 148 (1):291-5.

24. Amellal B, Katlama C, Calvez V. Evaluation of the use of dried spots and of different storage conditions of plasma for HIV-1 RNA quantification. HIV medicine. 2007 Sep. 1; 8 (6):396-400.

25. Tsui N B, Ng E K, Lo Y D. Stability of endogenous and added RNA in blood specimens, serum, and plasma. Clinical chemistry. 2002 Oct. 1; 48 (10):1647-53.

26. Frazão C, McVey C E, Amblar M, Barbas A, Vonrhein C, Arraiano C M, Carrondo M A. Unravelling the dynamics of RNA degradation by ribonuclease II and its RNA-bound complex. Nature. 2006 Sep. 7; 443 (7107):110.

27. Jorgez C J. Simpson J L, Bischoff F Z. Recovery and amplification of placental RNA from dried maternal blood spots: utility for non-invasive prenatal diagnosis. Reproductive biomedicine online. 2006 Jan. 1; 13 (4):558-61.

28. Bauer M, Polzin S, Patzelt D. Quantification of RNA degradation by semi-quantitative duplex and competitive RT-PCR: a possible indicator of the age of bloodstains?. Forensic science international. 2003 Dec. 17; 138 (1):94-103.

29. Weber D G, Casjens S, Rozynek P, Lehnert M, Zilch-Schöneweis S, Bryk O, Taeger D, Gomolka M, Kreuzer M, Otten H, Pesch B. Assessment of mRNA and microRNA stabilization in peripheral human blood for multicenter studies and biobanks. Biomarker insights. 2010; 5:95.

30. Muller M C, Merx K, Weiber A, Kreil S, Lahaye T, Hehlmann R, Hochhaus A. Improvement of molecular monitoring of residual disease in leukemias by bedside RNA stabilization. Leukemia. 2002 Dec. 1; 16 (12):2395.

31. US Department of Health and Human Services. Guidance for industry, bioanalytical method validation. 2001 May:1-25.

32. Jager N G, Rosing H, Schellens J H, Beijnen J H. Procedures and practices for the validation of bioanalytical methods using dried blood spots: a review. Bioanalysis. 2014 September; 6 (18):2481-514.

33. Shenoy A R, Wellington D A, Kumar P, Kassa H, Booth C J, Cresswell P, MacMicking JD. GBP5 promotes NLRP3 inflammasome assembly and immunity in mammals. Science. 2012 Apr. 27; 336 (6080):481-5.

34. Lang R, Hammer M, Mages J. DUSP meet immunology: dual specificity MAPK phosphatases in control of the inflammatory response. The Journal of Immunology. 2006 Dec. 1; 177 (11):7497-504.

35. Sebzda E, Zou Z, Lee J S, Wang T, Kahn M L. Transcription factor KLF2 regulates the migration of naive T cells by restricting chemokine receptor expression patterns. Nature immunology. 2008 Mar. 1; 9 (3):292.

36. Barber R D, Harmer D W, Coleman R A, Clark B J. GAPDH as a housekeeping gene: analysis of GAPDH mRNA expression in a panel of 72 human tissues. Physiological genomics. 2005 May 11; 21 (3):389-95.

37. Bland J M, Altman D. Statistical methods for assessing agreement between two methods of clinical measurement. The Lancet. 1986 Feb. 8; 327 (8476):307-10.

38. McDade T W. Development and validation of assay protocols for use with dried blood spot samples. American Journal of Human Biology. 2014 Jan. 1; 26 (1):1-9.

39. Conover W J, Iman R L. Rank transformations as a bridge between parametric and nonparametric statistics. The American Statistician. 1981 Aug. 1; 35 (3):124-9.

40. Amellal B, Katlama C, Calvez V. Evaluation of the use of dried spots and of different storage conditions of plasma for HIV-1 RNA quantification. HIV medicine. 2007 Sep. 1; 8 (6):396-400.

41. Denniff P, Spooner N. Effect of storage conditions on the weight and appearance of dried blood spot samples on various cellulose-based substrates. Bioanalysis. 2010 November; 2 (11):1817-22.

42. Denniff P, Woodford L, Spooner N. Effect of ambient humidity on the rate at which blood spots dry and the size of the spot produced.

43. Smit P W, Elliott I, Peeling R W, Mabey D, Newton P N. An overview of the clinical use of filter paper in the diagnosis of tropical diseases. The American journal of tropical medicine and hygiene. 2014 Feb. 5; 90 (2):195-210.

44. Taylor G A, Feng C G, Sher A. p47 GTPases: regulators of immunity to intracellular pathogens. Nature reviews. Immunology. 2004 Feb. 1; 4 (2):100.

45. Jacobs S R, Damania B. NLRs, inflammasomes, and viral infection. Journal of leukocyte biology. 2012 Sep. 1; 92 (3):469-77.

46. Culley J M, Svendsen E. A review of the literature on the validity of mass casualty triage systems with a focus on chemical exposures. American journal of disaster medicine. 2014; 9 (2):137.

47. Decker J A, DeBord D G, Bernard B, Dotson G S, Halpin J, Hines C J, et al. Recommendations for biomonitoring of emergency responders: focus on occupational health investigations and occupational health research. Military medicine. 2013 January; 178 (1):68.

48. Speake C, Whalen E, Gersuk V H, Chaussabel D, Odegard J M, Greenbaum C J. Longitudinal monitoring of gene expression in ultra-low-volume blood samples self-collected at home. Clinical & Experimental Immunology. 2017 May 1; 188 (2):226-33.

49. Li W, Tse F L. Dried blood spot sampling in combination with LC-MS/MS for quantitative analysis of small molecules. Biomedical Chromatography. 2010 Jan. 1; 24 (1):49-65.

50. PreAnalytix. PAXgene Blood RNA Kit Handbook. Hilden (Germany): Qiagen; 2009.

51. Qiagen. RNeasy Micro Handbook. 2nd Ed. Hilden (Germany): Qiagen; 2007.

52. Qiagen. QuantiTect Probe PCR Handbook. Hilden (Germany): Qiagen; 2009.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, devices, systems, computer readable media, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. A sample collection device, comprising:

at least a first body structure portion that comprises at least one drying agent compartment configured to receive at least one drying agent;

at least a second body structure portion operably connected, or connectable, to the first body structure portion, which second body structure portion comprises at least one sample collection support compartment comprising one or more segments that communicate with the drying agent compartment at least when the first and second body structure portions are operably connected to one another in a closed position, which sample collection support compartment is configured to receive at least one sample collection support;

at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and, at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions wherein the drying agent compartment comprises at least one frame structure that substantially surrounds at least regions of the sample collection support that comprise the sample and maintains at least one gap between the regions of the sample collection support that comprise the sample and the drying agent at least when the first and second body structure portions are operably connected to one another in the closed position with the sample collection support positioned in the sample collection support compartment and the drying agent positioned in the drying agent compartment;

wherein the drying agent compartment comprises at least one retaining structure having one or more openings disposed therethrough, which openings communicate with the drying agent compartment;

wherein the second body structure portion comprises at least one retaining element structured to retain the sample collection support in the sample collection support compartment; and wherein the closure mechanism comprises at least one latch element and at least one ridge element that engages the latch element at least when the first and second body structure portions are operably connected to one another in the closed position and when the latch element and the ridge element are in a closed position relative to one another.

2. The sample collection device of claim 1, wherein the drying agent compartment comprises at least one movable closure that is movable between at least open and closed positions.

3. The sample collection device of claim 1, wherein the first and second body structure portions are operably connected to one another via at least one hinge structure.

4. The sample collection device of claim 1, wherein the sealing material comprises at least one gasket.

5. The sample collection device of claim 1, wherein at least portions of the sealing material are fabricated integral with the first body structure portion and/or the second body structure portion.

6. The sample collection device of claim 1, wherein the first body structure portion comprises at least one protrusion and wherein the second body structure portion comprises at least one groove that is configured to receive at least a portion of the sealing material, which protrusion is configured to compress the sealing material at least in the groove at least when the first and second body structure portions are operably connected to one another in the closed position with the sealing material disposed between the sections of the first and second body structure portions.

7. The sample collection device of claim 1, wherein the closure mechanism comprises at least one rotatable clamping structure.

8. The sample collection device of claim 7, wherein the rotatable clamping structure comprises at least one latch element rotatably attached to the second body structure portion and wherein the first body structure portion comprises at least one ridge element that engages the latch element at least when the first and second body structure portions are operably connected to one another in the closed position and when the latch element and the ridge element are in a closed position relative to one another.

9. The sample collection device of claim 1, wherein the drying agent compartment comprises the drying agent.

10. The sample collection device of claim 1, wherein the sample collection support compartment comprises the sample collection support.

11. A kit, comprising:

at least one sample collection device that comprises:

at least a first body structure portion that comprises at least one drying agent compartment configured to receive at least one drying agent;

at least a second body structure portion operably connected, or connectable, to the first body structure portion, which second body structure portion comprises at least one sample collection support compartment comprising one or more segments that communicate with the drying agent compartment at least when the first and second body structure portions are operably connected to one another in a closed position, which sample collection support compartment is configured to receive at least one sample collection support;

at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions;

wherein the drying agent compartment comprises at least one frame structure that substantially surrounds at least regions of the sample collection support that comprise the sample and maintains at least one gap between the regions of the sample collection support that comprise the sample and the drying agent at least when the first and second body structure portions are operably connected to one another in the closed position with the sample collection support positioned in the sample collection support compartment and the drying agent positioned in the drying agent compartment;

wherein the drying agent compartment comprises at least one retaining structure having one or more openings disposed therethrough, which openings communicate with the drying agent compartment;

wherein the second body structure portion comprises at least one retaining element structured to retain the sample collection support in the sample collection support compartment; and wherein the closure mechanism comprises at least one latch element and at least one ridge element that engages the latch element at least when the first and second body structure portions are operably connected to one another in the closed position and when the latch element and the ridge element are in a closed position relative to one another; and, one or more drying agents.

12. The kit of claim 11, further comprising one or more sample collection supports.

13. A method of drying an item in either a liquid or solid form in the sample collection device of claim 1 comprising:

positioning the item in the sample collection device containing an amount of at least one drying agent sufficient to dry the item;

positioning the at least one closure mechanism in a substantially airtight closed position, thereby producing a substantially airtight interior of the sample collection device; and drying the item within the sample collection device.

14. A method of preserving an analyte in an item in either a liquid or solid form in the sample collection device of claim 1 comprising:

positioning the item in the sample collection device containing an amount of at least one drying agent sufficient to dry the item;

positioning the at least one closure mechanism in a substantially airtight closed position, thereby producing a substantially airtight interior of the sample collection device; and removing substantially all detectable moisture from the item.

15. A method of collecting a sample, the method comprising:

placing at least an aliquot of the sample on a sample collection support;

positioning the sample collection support in a sample collection support compartment of a sample collection device, which sample collection device comprises:

at least a first body structure portion that comprises at least one drying agent compartment configured to receive at least one drying agent;

at least a second body structure portion operably connected, or connectable, to the first body structure portion, which second body structure portion comprises the sample collection support compartment, which sample collection support compartment comprises one or more segments that communicate with the drying agent compartment at least when the first and second body structure portions are operably connected to one another in a closed position;

at least one sealing material disposed, or disposable, between at least sections of the first and second body structure portions at least when the first and second body structure portions are operably connected to one another in the closed position, which sealing material substantially seals at least the drying agent compartment and the sample collection support compartment when the first and second body structure portions are operably connected to one another in the closed position; and at least one closure mechanism operably connected, or connectable, to the first and second body structure portions at least when the first and second body structure portions are operably connected to one another in the closed position, which closure mechanism is configured to maintain the first and second body structure portions in the closed position at least when the first and second body structure portions are operably connected to one another in the closed position with the sealing material disposed between the sections of the first and second body structure portions;

wherein the drying agent compartment comprises at least one frame structure that substantially surrounds at least regions of the sample collection support that comprise the sample and maintains at least one gap between the regions of the sample collection support that comprise the sample and the drying agent at least when the first and second body structure portions are operably connected to one another in the closed position with the sample collection support positioned in the sample collection support compartment and the drying agent positioned in the drying agent compartment;

wherein the drying agent compartment comprises at least one retaining structure having one or more openings disposed therethrough, which openings communicate with the drying agent compartment;

wherein the second body structure portion comprises at least one retaining element structured to retain the sample collection support in the sample collection support compartment; and wherein the closure mechanism comprises at least one latch element and at least one ridge element that engages the latch element at least when the first and second body structure portions are operably connected to one another in the closed position and when the latch element and the ridge element are in a closed position relative to one another;

positioning the drying agent in the drying agent compartment of the sample collection device; and, closing the closure mechanism of the sample collection device to maintain the first and second body structure portions in the closed position with the sealing material disposed between the sections of the operably connected first and second body structure portions, thereby collecting the sample.

16. The method of claim 15, wherein the sample comprises blood obtained from a subject.

17. The method of claim 15, wherein the sample collection support comprises a sample collection card.

18. The method of claim 15, comprising positioning the drying agent in the drying agent compartment before positioning the sample collection support in the sample collection support compartment of the sample collection device.

19. The method of claim 15, further comprising storing the sample in the sample collection device.

20. The method of claim 15, further comprising analyzing the sample after opening the sample collection device.

21. The method of claim 15, further comprising:

drying the sample within the sample collection device.

22. The method of claim 21, wherein drying is without applying a negative pressure to the interior of the sample collection device.

23. The method of claim 22, wherein drying comprises reducing the relative humidity in the interior of the sample collection device to less than 15% relative humidity.

24. The method of claim 23, wherein the drying comprises reducing the relative humidity in the interior of the sample collection device to less than 1% relative humidity.

25. The method of claim 23, wherein the drying comprises reducing the relative humidity in the interior of the sample collection device to less than 0.01% relative humidity.

26. The method of claim 22, wherein drying is conducted at 25° C. and 65% relative humidity and wherein the relative humidity in the interior of the sample collection device is less than 0.01% relative humidity after about 600 minutes.

27. The method of claim 26, wherein the relative humidity in the interior of the sample collection device is less than 0.01% relative humidity after about 400 minutes.

28. The method of claim 21, comprising removing substantially all detectable moisture from the sample.

29. The method of claim 28, wherein removing substantially all detectable moisture from the sample is determined by a stable measurement using a resistance sensor.

30. The method of claim 28, wherein the sample is one or more dried blood spots (DBS).

31. The method of claim 30, wherein removing substantially all detectable moisture from the sample is achieved in about 120 minutes.

32. The method of claim 31, wherein removing substantially all detectable moisture from the sample is achieved in about 90 minutes.

33. The method of claim 21, wherein the sample comprises an environmental or biological sample.

34. The method of claim 33, further comprising analyzing the sample for at least one analyte.

35. The method of claim 34, wherein the at least one analyte is a xenobiotic.

36. The method of claim 34, wherein the at least one analyte is a metabolite.

37. The method of claim 34, wherein the at least one analyte is a nucleic acid, protein, lipid or carbohydrate.

38. The method of claim 37, wherein the nucleic acid is RNA or DNA.

39. The method of claim 38, wherein the nucleic acid is RNA.

40. The method of claim 15, wherein the drying agent compartment comprises at least one movable closure that is movable between at least open and closed positions.

* * * * *